United States Patent

Ebihara et al.

[11] Patent Number: 5,982,900
[45] Date of Patent: Nov. 9, 1999

[54] CIRCUIT AND SYSTEM FOR MODULO EXPONENTIATION ARITHMETIC AND ARITHMETIC METHOD OF PERFORMING MODULO EXPONENTIATION ARITHMETIC

[75] Inventors: Hidenori Ebihara; Kiyoto Kawazaki, both of Miyasaki, Japan

[73] Assignee: Oki Electric Industry Co., Ltd., Tokyo, Japan

[21] Appl. No.: 08/833,002

[22] Filed: Apr. 4, 1997

[30] Foreign Application Priority Data

Apr. 5, 1996 [JP] Japan ................................. 8-110057

[51] Int. Cl.$^6$ ........................................................... H04L 9/30
[52] U.S. Cl. ........................................................... 380/30
[58] Field of Search ........................ 380/28, 30; 364/746

[56] References Cited

U.S. PATENT DOCUMENTS

| | | | |
|---|---|---|---|
| 5,101,431 | 3/1992 | Even | 380/30 |
| 5,261,001 | 11/1993 | Dariel | 380/30 |
| 5,321,752 | 6/1994 | Iwamura et al. | 380/28 |
| 5,448,639 | 9/1995 | Arazi | 382/30 |
| 5,499,299 | 3/1996 | Takenaka et al. | 380/30 |
| 5,666,419 | 9/1997 | Yamamoto et al. | 380/28 |
| 5,724,279 | 3/1998 | Benaloh et al. | 364/746 |
| 5,745,398 | 4/1998 | Monier | 380/30 |

FOREIGN PATENT DOCUMENTS 0 531 158 A2   9/1992   European Pat. Off. .
0 577 000 A1   6/1993   European Pat. Off. .

*Primary Examiner*—Salvatore Cangialosi
*Attorney, Agent, or Firm*—Wenderoth, Lind & Ponack, L.L.P.

[57] ABSTRACT

In order to avoid large-scale arithmetic circuit and a complicated processing procedure in performing modular arithmetic such as a modular arithmetic exponentiation and modular multiplication in use for encrypting plaintext or the like, the method and apparatus of the present invention for performing the modular arithmetic which executes a first common equation of a modular multiplication arithmetic $f(A, B)=A \times B \bmod N$ ("mod" denotes modular arithmetic) to calculate a remainder of a product of an integer A and an integer B divided by an integer N, using a second common equation of Montgomery's replacement arithmetic $f(A, B)=A \times B \times R' \bmod N$ corresponding to the first common equation $f(A, B)=A \times B \bmod N$ (R' denotes a value to meet the equation $R \times R' \bmod N = 1$ with respect to R which is an exponent of 2 slightly larger than modulus N), a first replacement arithmetic $f_1'(R^S \bmod N \times A^T, B^U)$ (S denotes one of 0, 1, and 2; T denotes one of 0 and 1; and U denotes one of 0 and 1), and a second replacement arithmetic $f_2'\{R^{2-S} \bmod N \times A^T \times f_1'(R^S \bmod N \times A^T, B^U), R^S \bmod N \times A^{1-T} \times B^{1-U})\}$ are performed.

44 Claims, 22 Drawing Sheets

Fig. 7

OPERATION OF THE FIRST EMBODIMENT

A'3 A'2 A'1 A'0 × WI3 WI2 WI1 WI0 = Wh3 Wh2 Wh1 Wh0 WI3 WI2 WI1 WI0

① A'0 × WI0 + 0 = RH WI0
② A'1 × WI0 + 0 + RH = RH Wh0
③ A'2 × WI0 + 0 + RH = RH Wh1
④ A'3 × WI0 + 0 + RH = Wh3 Wh2
⑤ A'0 × WI1 + Wh0 = RH WI1
⑥ A'1 × WI1 + Wh1 + RH = RH Wh0
⑦ A'2 × WI1 + Wh2 + RH = RH Wh1
⑧ A'3 × WI1 + Wh3 + RH = Wh3 Wh2
⑨ A'0 × WI2 + Wh0 = RH WI2
⑩ A'1 × WI2 + Wh1 + RH = RH Wh0
⑪ A'2 × WI2 + Wh2 + RH = RH Wh1
⑫ A'3 × WI2 + Wh3 + RH = Wh3 Wh2
⑬ A'0 × WI3 + Wh0 = RH WI3
⑭ A'1 × WI3 + Wh1 + RH = RH Wh0
⑮ A'2 × WI3 + Wh2 + RH = RH Wh1
⑯ A'3 × WI3 + Wh3 + RH = Wh3 Wh2

[ Whmem-WImem * ]
INDICATING THAT 65H IS STORED IN Whmem AND 72H IS STORED IN WImem IN CASE OF CALCULATED RESULT 6572H OF 6AH × F5H IN CALCULATION OF 8 BITS × 8 BITS, FOR EXAMPLE

Fig. 11

OPERATION OF THE FOURTH EMBODIMENT

S3 S2 S1 S0 × WI3 WI2 WI1 WI0 + Wh3 Wh2 Wh1 Wh0 = WH3 WH2 WH1 WH0

| | | |
|---|---|---|
| ① S0 × WI0 + Wh0 = RH WI0 | ⑨ | S0 × WI2 + Wh0 = RH WI2 |
| ② S1 × WI0 + Wh1 = RH Wh0 | ⑩ | S1 × WI2 + Wh1 = RH Wh0 |
| ③ S2 × WI0 + Wh2 = RH Wh1 | ⑪ | S2 × WI2 + Wh2 = RH Wh1 |
| ④ S3 × WI0 + Wh3 = RH Wh2 | ⑫ | S3 × WI2 + Wh3 = RH Wh2 |
| ⑤ S0 × WI1 + Wh0 = RH WI1 | ⑬ | S0 × WI3 + Wh0 = RH WI3 |
| ⑥ S1 × WI1 + Wh1 = RH Wh0 | ⑭ | S1 × WI3 + Wh1 = RH Wh0 |
| ⑦ S2 × WI1 + Wh2 = RH Wh1 | ⑮ | S2 × WI3 + Wh2 = RH Wh1 |
| ⑧ S3 × WI1 + Wh3 = RH Wh2 | ⑯ | S3 × WI3 + Wh3 = RH Wh2 |

Fig. 12

ARITHMETIC OPERATION OF THE FOURTH EMBODIMENT

8591 × 4673 + 2069 = 4014 7812

| | | | | | | | | | |
|---|---|---|---|---|---|---|---|---|---|
| ① | 1 | × | 3 | + | 9 | | = | 1 | 2 |
| ② | 9 | × | 3 | + | 6 | + 1 | = | 3 | 4 |
| ③ | 5 | × | 3 | + | 0 | + 3 | = | 1 | 8 |
| ④ | 8 | × | 3 | + | 2 | + 1 | = | 2 | 7 |
| ⑤ | 1 | × | 7 | + | 4 | | = | 1 | 1 |
| ⑥ | 9 | × | 7 | + | 8 | + 1 | = | 7 | 2 |
| ⑦ | 5 | × | 7 | + | 7 | + 7 | = | 4 | 9 |
| ⑧ | 8 | × | 7 | + | 2 | + 4 | = | 6 | 2 |
| ⑨ | 1 | × | 6 | + | 2 | | = | 0 | 8 |
| ⑩ | 9 | × | 6 | + | 9 | + 0 | = | 6 | 3 |
| ⑪ | 5 | × | 6 | + | 2 | + 6 | = | 3 | 8 |
| ⑫ | 8 | × | 6 | + | 6 | + 3 | = | 5 | 7 |
| ⑬ | 1 | × | 4 | + | 3 | | = | 0 | 7 |
| ⑭ | 9 | × | 4 | + | 8 | + 0 | = | 4 | 4 |
| ⑮ | 5 | × | 4 | + | 7 | + 4 | = | 3 | 1 |
| | 8 | × | 4 | + | 5 | + 3 | = | 4 | 0 |

Fig. 14

| OPERATION OF THE FIFTH EMBODIMENT(1) |
|---|
| A3 A2 A1 A0 · B0 + C0 |
| WI3 WI2 WI1 WI0 × S0 + Wh0 = RA RB RC RD WI0 |
| [INITIALIZATION]<br>  RA = RB = RC = RD ="0" . Xi-reg ← S0 . Ai-reg ← Wh0<br>  Yi-reg[0] ← WI0、Yi-reg[1] ← WI1、Yi-reg[2] ← WI2、Yi-reg[3] ← WI3 |
|     [STEP1]<br>        Xi-reg × Yi-reg[0] + RD + Ai-reg = (R-high)(R-low)<br>        RD ← RC , RC ← RB ,RB ← RA<br>        RA ← (R-high) , <u>WI0</u> ← (R-low) |
|     [STEP2]<br>        Xi-reg × Yi-reg[1] + RD + RA = (R-high)(R-low)<br>        RD ← RC , RC ← RB<br>        RA ← (R-high) , RB ← (R-low) |
|     [STEP3]<br>        Xi-reg × Yi-reg[2] + RD + RA = (R-high)(R-low)<br>        RD ← RC , RC ← RB<br>        RA ← (R-high) , RB ← (R-low) |
|     [STEP4]<br>        Xi-reg × Yi-reg[3] + RD + RA = (R-high)(R-low)<br>        RD ← RC , RC ← RB<br>        RA ← (R-high) , RB ← (R-low) |

Fig. 15

| OPERATION OF THE FIFTH EMBODIMENT(2) |
|---|
| A3 A2 A1 A0 · B3 B2 B1 B0 + C3 C2 C1 C0 |
| WI3 WI2 WI1 WI0 ×S3 S2 S1 S0 + Wh3 WH2 Wh1 Wh0 = RA RB RC RD WI3 WI2 WI1 WI0 |

[INITIALIZATION]
  RA = RB = RC = RD ="0" . Xi-reg ← S0 . Ai-reg ← Wh0
  Yi-reg[0] ← WI0, Yi-reg[1] ← WI1, Yi-reg[2] ← WI2, Yi-reg[3] ← WI3

---

<TIME1>
  [STEP1]
    Xi-reg × Yi-reg[0] + RD + Ai-reg = (R-high)(R-low)
    RD ← RC , RC ← RB ,RB ← RA ,RA ← (R-high) , WI0 ← (R-low)
  [STEP2]
    Xi-reg × Yi-reg[1] + RD + RA = (R-high)(R-low)
    RD ← RC , RC ← RB ,RA ← (R-high) , RB ← (R-low)
  [STEP3]
    Xi-reg × Yi-reg[2] + RD + RA = (R-high)(R-low)
    RD ← RC , RC ← RB ,RA ← (R-high) , RB ← (R-low)
  [STEP4]
    Xi-reg × Yi-reg[3] + RD + RA = (R-high)(R-low)
    RD ← RC , RC ← RB ,RA ← (R-high) , RB ← (R-low)

*DURING THE PERIOD OF TIME FROM STEP 2 TO STEP 4,MODIFICATION OF ADDRESS
   FOR MEMORIES, PRECHARGING AND STORING OF DATA IN Xi-reg AND Ai-reg ARE PERFORMED.

---

<TIME2>
  [STEP1]
    THE SAME AS THE CASE OF TIME 1 EXCEPT OPERATION OF WI1 ← (R-low)
  [STEP2] ~ [STEP4]
    ABSOLUTELY THE SAME AS THE CASE OF TIME 1

---

<TIME3>
  [STEP1]
    THE SAME AS THE CASE OF TIME 1 EXCEPT OPERATION OF WI2 ← (R-low)
  [STEP2] ~ [STEP4]
    ABSOLUTELY THE SAME AS THE CASE OF TIME 1

---

<TIME4>
  [STEP1]
    THE SAME AS THE CASE OF TIME 1 EXCEPT OPERATION OF WI3 ← (R-low)
  [STEP2] ~ [STEP4]
    ABSOLUTELY THE SAME AS THE CASE OF TIME 1

EXAMPLE OF CALCULATING N' AND R'

[EXAMPLE]   N = 215 = "1101 0111"$_2$

R = $2^8$ = "10000 0000"$_2$ $2^0 \cdot N$ ;  $\quad$ $2^7\, 2^6\, 2^5\, 2^4\, 2^3\, 2^2\, 2^1\, 2^0$
$\quad\quad\quad\quad\quad$ ↓ ↓ ↓ ↓ ↓ ↓ ↓ ↓
$\quad\quad\quad\quad\quad$ 1 1 0 1 (0) 1 1 1

TO CONVERT ALL LOWER n BITS INTO "1"

$2^3 \cdot N$ ; +) 1 1 0 1 0 1 1 1
$\quad\quad\quad\quad$ 1 1 1 1 0 0 (0) 1 1 1 1

DITTO $\quad$ $2^4 \cdot N$ ; +) 1 1 0 1 0 1 1 1
$\quad\quad\quad\quad$ 1 0 1 0 0 1 1 1 1 1 1 1 1
$\quad\quad\quad\quad\quad\quad$ ⎵
$\quad\quad\quad\quad\quad\quad$ R'-1

THEN,  $\quad$ N' = $2^0 + 2^3 + 2^1$ = 25

$\quad\quad\quad\quad$ R' = $2^4 + 2^2 + 1$ = 21

CIRCUIT AND SYSTEM FOR MODULO EXPONENTIATION ARITHMETIC AND ARITHMETIC METHOD OF PERFORMING MODULO EXPONENTIATION ARITHMETIC

BACKGROUND OF THE INVENTION

The present invention relates to an encryption and decryption technique of information used in the field such as information communication networks, traffic systems, banking facilities, medical services, distribution industries and the like, and more particularly to a circuit and a system for modulo exponentiation arithmetic and an arithmetic method of performing modulo exponentiation arithmetic for realizing the encryption and decryption of the information.

With the development of the information communication technique, ensuring the security on the information network (to prevent stealing and destruction of data) is being regarded as important. For this purpose, the encryption and decryption technique of information is being used not only in the information communication field but also in the fields such as traffic systems, banking facilities, medical service, distribution industries and the like. Accordingly, the encryption and decryption technique of this kind is required to be able to realize the high-degree security by a simple principle.

In order to facilitate understanding of the technique of this kind, encryption and decryption of information is now described in brief.

In cryptography, the "asymmetric cryptograph algorithm" is excellent qualitatively. In the asymmetric cryptograph algorithm, the encryption key and the decryption key are different from each other and one key cannot be calculated easily from the other key.

The representatives of the asymmetric cryptograph algorithm involve the RSA cryptograph, the Elgamal cryptograph, the Rabin cryptograph and the Williams cryptograph using the modulo exponentiation arithmetic. In the application of the cryptograph algorithm, there is the "digital signature" system and there is a tendency to standardization thereof in the present. The representatives of the digital signature systems to be standardized involve the RSA signature method, the Elgamal signature method, the Schnorr signature method and the DSA (Digital Signature Algorithm) method, all of which use the modulo exponentiation arithmetic of a long bit length. Accordingly, it is indispensable to develop an arithmetic unit capable of completing the modulo exponentiation arithmetic having a long bit length in a short time in order to realize the digital signature system.

The RSA cryptograph, the Elgamal cryptograph, the Rabin cryptograph and the Williams cryptograph basically use the modulo exponentiation arithmetic form represented by the following equation (1). The equation (1) means that a remainder of $X^Y$ divided by N is calculated. Further, in the equation (1), X represents a plaintext to be encrypted (decrypted), and Y and N represent keys for encryption (decryption).

$$X^Y \bmod N \tag{1}$$

The modulo exponentiation arithmetic can be used to perform the encryption and the decryption of information easily and make it difficult to cryptanalyze the keys by lengthening the bit length of operands of X, Y and N.

However, when the bit length of the operand is made long, it takes a long time to perform the modulo exponentiation arithmetic. The point is how the modulo exponentiation arithmetic having a long bit length of the operand is completed in a short time.

The actual encryption and decryption using the modulo exponentiation arithmetic and the usage thereof are now described by taking the RSA cryptograph as an example.

(1) SUMMARY OF ENCRYPTION AND DECRYPTION OF THE RSA CRYPTOGRAPH

For the encryption, the following equation is used:

$$C = M^e \bmod n \tag{2}$$

For the decryption, the following equation is used:

$$M = C^d \bmod n \tag{3}$$

where M represents a plaintext to be encrypted and C represents an encrypted plaintext, that is, a ciphertext. In the equation (2) e and n represent encryption keys and in the equation (3) d and n decryption keys. These keys are previously given the following conditions:

$$n = p \times q \tag{4}$$

$$1 == e \times d \bmod \{LCM(p-1, q-1)\} \tag{5}$$

where "==" means that the left side and the right side of the equation are similar and LCM means the least common multiple. Further, p and q are relatively prime integers. In addition, the keys e and n are public keys and d, n and q are secret keys.

The above equations (4) and (5) both define conditions of numerical values of the modulo exponentiation arithmetic in the encryption algorithm. The equation (4) defines that n is a product of large prime numbers p and q which are prime to each other. The prime numbers p and q are both odd numbers and accordingly the product n must be naturally an odd number. Further, the equation (5) shows that a remainder of a product c×d of c and d divided by the least common multiple of values obtained by subtracting 1 from p and q shown in the equation (4) is 1.

On the basis of the equations (4) and (5), the plaintext M is encrypted by means of the equation (2) and the encrypted plaintext M (ciphertext C) is decrypted by means of the equation (3).

(2) EXAMPLE OF ENCRYPTION AND DECRYPTION

Referring to FIG. 2, description is made to a processing method performed by a transmitting person A and a receiving person B in the case where "the transmitting person A encrypts the plaintext M into the ciphertext C to transmit it and the receiving person B decrypts the ciphertext C into the plaintext M." (with the digital signature) as a definite example.

THE PROCESS PERFORMED BY THE TRANSMITTING PERSON A:

The plaintext MA prepared by the transmitting person A is encrypted by means of the transmitting person's own secret key dA to prepare a signature text CA (signature).

$$CA == MA^{dA} \bmod nA \tag{6}$$

The public key eB of the person B is used to prepare an encrypted signature text cA (encryption).

$$cA == CA^{eB} \bmod nB \tag{7}$$

The cA is transmitted to the person B.

THE PROCESS PERFORMED BY THE RECEIVING PERSON B:

The encrypted signature text cA received by the person B is decrypted by means of the receiving person's own secret key dB (decryption).

$$cA^{dB} \bmod nB == (CA^{eB} \bmod nB)^{dB} \bmod nB \qquad (8)$$

When $CA^{eB}=X$, the equation (8) can be transformed to:

$$(CA^{eB} \bmod nB)^{dB} \bmod nB = (X \bmod nB)^{dB} \bmod nB \qquad (9)$$

In the equation (9), when XmodnB=Y, that is, when a remainder of X divided by nB is Y and a quotient thereof is k, the equation can be expressed by:

$$X=k \times nB+Y$$

$$Y=X-k \times nB \qquad (10)$$

Accordingly, when the equation (10) is substituted for the corresponding portion in the right side of the equation (9), the equation (9) is expressed by:

$$(X \bmod nB)^{dB} \bmod nB$$

$$=Y^{dB} \bmod nB$$

$$=(X-k \times nB)^{dB} \bmod nB \qquad (11)$$

When $(X-k \times nB)^{dB}$ of the equation (11) is expanded by using constants ai (i=1, 2, ... ), the (X-k×nB)dB can be expressed by:

$$(X-k \times nB)^{dB}$$

$$=(X^{dB}-a1 \times X^{dB-1} \times nB + a2 \times X^{dB-2} \times nB^{2-} \ldots -ai \times nB^{dB}) \qquad (12)$$

When the equation (12) is substituted for the corresponding portion of the equation (11), $$\begin{aligned}(X \bmod nB)^{dB} \bmod nB &= Y^{dB} \bmod nB \\ &= (X - k \times nB)^{dB} \bmod nB \\ &= (X^{dB} - a1 \times X^{dB-1} \times nB + a2 \times X^{dB-2} \times \\ &\quad nB^2 - \ldots - ai \times nB^{dB}) \bmod nB \\ &= X^{dB} \bmod nB - a1 \times X^{dB-1} \times nB \bmod nB + \\ &\quad a2 \times X^{dB-2} \times nB^2 \bmod nB - \ldots \\ &\quad -ai \times nB^{dB} \bmod nB\end{aligned}$$

The second and subsequent terms of this equation can be all divided by nB and can be hence deleted. Accordingly, this equation is expressed by:

$$=X^{dB} \bmod nB \qquad (13)$$

$CA^{eB}=X$ is assumed above and accordingly when X is returned to $CA^{eB}$, the equation is obtained as follows:

$$=(CA^{eB})^{dB} \bmod nB \qquad (14)$$

When the above process is summarized, the above equation is as follows:

$$\begin{aligned}cA^{dB} \bmod nB &== (CA^{eB} \bmod nB)^{dB} \bmod nB \\ &= (CA^{eB})^{dB} \bmod nB\end{aligned}$$

Since the eB and dB satisfy the equation (5), the eB and dB are expressed by the following equation by using a certain integer h.

$$eB \times dB = h(pB-1)+1$$

When the Fermat's small theorem that the equation: $X^{p-1} \bmod p=1$ is effected for the prime number p and any integer X which is prime to p is used, the above equation is expressed by:

$$\begin{aligned}CA^{eB \times dB} \bmod pB &= CA^{h(p-1)+1} \bmod pB \qquad (15)\\ &= CA \times CA^{h(p-1)} \bmod pB \\ &= CA \bmod pB\end{aligned}$$

Since the above equation is satisfied even if CA is a multiple of pB, $CA^{eB \times dB}-CA$ for all CA can be divided by pB. Similarly, $CA^{eB \times dB}-CA$ can be divided by qB. Since pB and qB are different prime numbers, $CA^{eB \times dB}-CA$ CA can be divided by nB=pB×qB. Accordingly, the following equation is effected.

$$cA^{dB} \bmod nB == CA^{eB \times dB} \bmod nB (=CA)$$

The public key eA of the transmitting person is used to prepare the plaintext MA (authentication of signature).

$$\begin{aligned}CA^{eA} \bmod nA &== (MA^{dA})^{eA} \bmod nA \\ &== (MA^{eA})^{dA} \bmod nA\end{aligned}$$

When calculation is made in the same manner as the above decryption process, the following equation is derived.

$$=MA$$

As described above, values of e, d and n are determined under condition of the equations (4) and (5) and the modulo exponentiation arithmetic form represented by the equation (1) is used basically, so that plaintext can be encrypted and the encrypted plaintext can be decrypted.

For example, when n=15, e=3, p=5, q=3 and d=11 (n=p×q=5×3=15, e×dmod(p−1)×(q−1)=3×11mod4×2=33mod8=1) and plaintext M=13, encryption and decryption are made as follows, respectively:

$$C=M^e \bmod n=13^3 \bmod 15=2197 \bmod 15=7$$

$$M=C^d \bmod n=7^{11} \bmod 15=1977326743 \bmod 15=13$$

It is confirmed that the plaintext M=13 is decrypted.

(3) MODULO EXPONENTIATION ARITHMETIC METHOD

The modulo exponentiation arithmetic method used in encryption and decryption is now described.

The modulo exponentiation arithmetic of $A=M^e \bmod N$ is executed by using the iterative square and multiplication method shown in the following flow 1 with the binary expansion of the integer e being $e=e^{k-1} \ldots e^1 e^0$.

```
begin
    A = 1
    for i = k − 1 down to 0 do
        begin
            A = A² mod N                           (16)
            if ei = 1 then A = A × M mod N         (17)
        end
end
```

The iterative square and multiplication method is expressed by a flow chart of FIG. 3.

First, an initial value 1 is loaded into a register A. The value stored in the register A is multiplied by itself to calculate A×A and the product A×A is divided by N to obtain a remainder. The remainder is stored in a register a. Then, the value stored in the register a is loaded into the register A. At this time, if the exponent e is equal to 1, the value stored in the register A is multiplied by the plaintext M and the product thereof is divided by N to obtain a remainder, which is stored in the register a. Then, the contents of the register a is stored into the register A again. If the exponent e is equal to 0, the above calculation is not performed and the value stored in the register A remains as it is without any operation. The above calculation is repeatedly performed from the most significant bit to the least significant bit of e, so that the value stored finally into the register A is a solution of the modulo exponentiation arithmetic to be calculated.

As described above, the foundation of the arithmetic is the multiplication and division (modular arithmetic) as shown by the equations (16) and (17). The multiplication performs A×A or A×M for the value of A having 1 as its initial value and the division performs modN for the value obtained by each multiplication. A pair of arithmetic operations of the multiplication and the division (A×AmodN or A×MmodN) are repeated in accordance with bit values of "e". That is, the multiplication and the division are performed in accordance with the contents of bits from the most significant bit to the least significant bit of "e".

The foregoing has described the modulo exponentiation arithmetic which can obtain a solution by repeating the basic remainder arithmetic or modular arithmetic, while the number of times of the repetition is several hundreds to thousands at most and accordingly the repetitive operation can be treated even by the software process. However, the modular arithmetic itself requires a large-scale arithmetic circuit and a complicated processing procedure in order to perform the division and accordingly it is desired to improve the modular arithmetic.

SUMMARY OF THE INVENTION

Therefore, the object of the present invention is to provide a method and apparatus for performing modular arithmetic more simply and efficiently.

According to an aspect of the present invention, the method and apparatus for a modular multiplication arithmetic which executes a first common equation of a modular multiplication arithmetic $f(A, B)=A\times BmodN$ ("mod" denotes modular arithmetic) to calculate a remainder of a product of an integer A and an integer B divided by an integer N, using a second common equation of Montgomery's replacement arithmetic $f'(A, B)=A\times B\times R'modN$ corresponding to the first common equation $f(A, B)=A\times BmodN$ (R' denotes a value to meet the equation $R\times R'modN=1$ with respect to R which is an exponent of 2 slightly larger than modulus N), the method and apparatus comprises first step or device for executing a first replacement arithmetic $f_1'$ ($R^S modN\times A^T$, $B^U$) (S denotes one of 0, 1, and 2; T denotes one of 0 and 1; and U denotes one of 0 and 1), and second step or means for executing a second replacement arithmetic $f_2'\{R^{2-S}modN\times A^T\times f_1'(R^S modN\times A^T, B^U), R^S modN\times A^{1-T}\times B^{1-U})\}$.

According to another aspect of the present invention, the method and apparatus serves to perform a modular exponentiation arithmetic which executes a general equation of a modular exponentiation arithmetic $F(M, E)=M^E modN$ ("mod" denotes modular arithmetic) to calculate a remainder of an integer M to the integer Eth power divided by an integer N, by executing a first common equation of a modular multiplication arithmetic $f(A, B)=A\times BmodN$ to calculate a remainder of a product of an integer A and an integer B divided by an integer N, using a second common equation of Monltgomery's replacement arithmetic $f'(A, B)=A\times B\times R'modN$ corresponding to the first common equation $f(A, B)=A\times BmodN$ (R' denotes a value to meet the equation $R\times R'modN=1$ with respect to R which is an exponent of 2 slightly larger than modulus N) in the iterative square and multiplication method for calculating the modular exponentiation arithmetic. The method and apparatus comprises first step or device for executing a first replacement arithmetic $f_1'(f_2', f_2')$ (the initial $f_1'=f_1'(RmodN, RmodN)$, second step or device for executing a second replacement arithmetic $f_2'(f_1', M\times RmodN)$, and third step or device for executing a third replacement arithmetic $f_3'(f_2', 1)$, wherein the third step of executing is laid after the first step of executing and the second step of executing are repeated at respective times specified by the integer E.

According to still another aspect of the present invention, the encrypting apparatus operates to prepare a cryptograph by encrypting a plaintext M with encryption keys E and N, wherein a common equation of Montgomery's replacement arithmetic $f'(A, B)=A\times B\times R'modN$ corresponding to a common equation $f(A, B)=A\times BmodN$ in the iterative square and multiplication method for executing the modular exponentiation arithmetic is employed. The encrypting apparatus comprises, for given X×RmodN and Y×RmodN, a first executing device operable to execute a first replacement arithmetic $f1'(X\times RmodN, X\times RmodN)=X^2 RmodN$, a second executing device aperable to execute a second replacement arithmetic $f2'(X\times RmodN, Y\times RmodN)=X\times Y\times RmodN$, and a third executing device operable to execute a third replacement arithmetic $f3'(X\times RmodN, 1)=XmodN$.

BRIEF DESCRIPTION OF THE DRAWINGS

FIG. 7 shows a hardware image for explaining operation of the first embodiment of the present invention;

FIG. 11 shows a hardware image for explaining operation of the fourth embodiment of the present invention;

FIG. 12 shows an arithmetic example for explaining operation of the fourth embodiment of the present invention;

FIG. 14 shows a hardware image for explaining operation of the fifth embodiment of the present invention;

FIG. 15 shows a hardware image for explaining operation of the fifth embodiment of the present invention;

Figure 16:
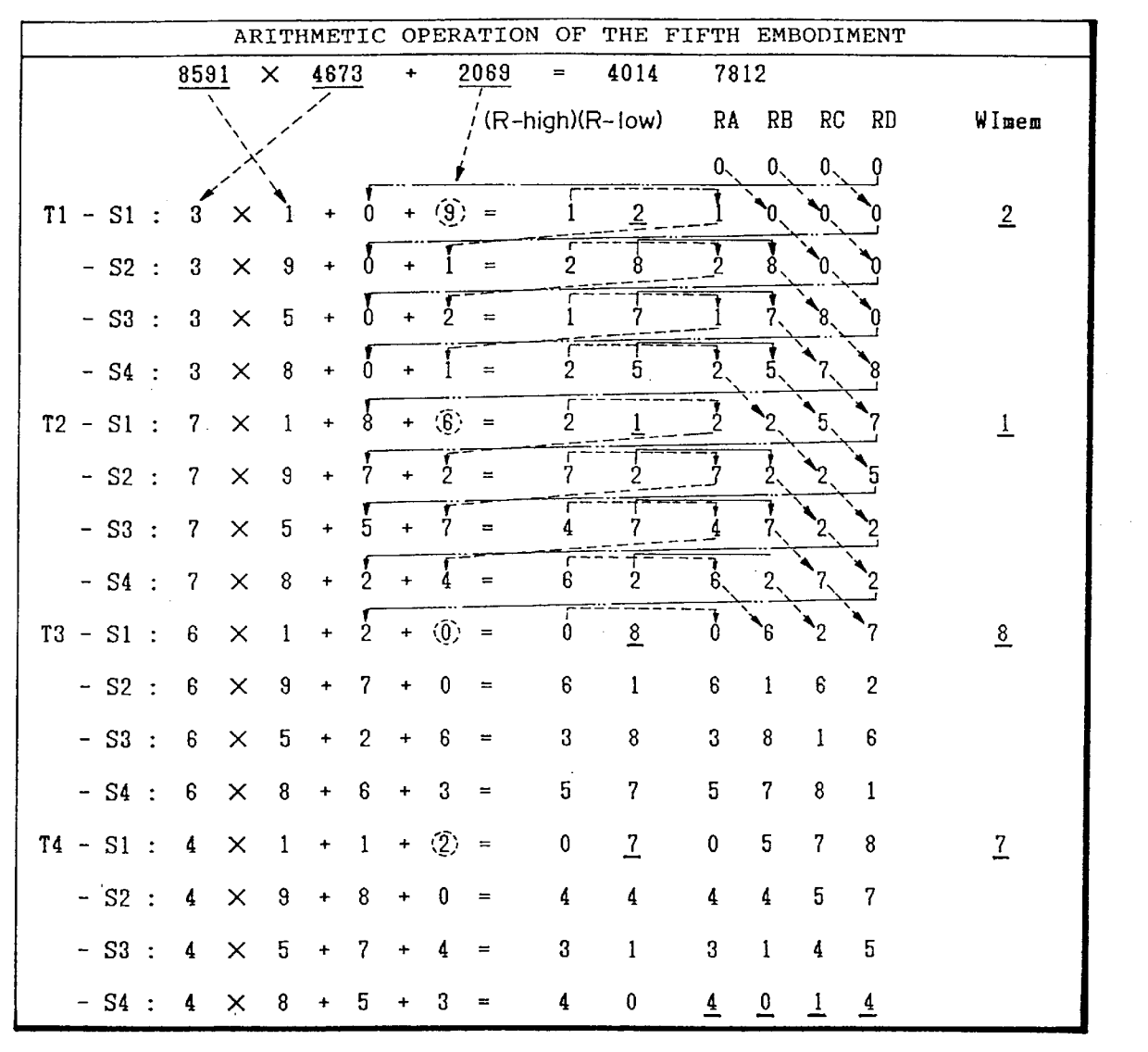

FIG. 16 shows an arithmetic example for explaining operation of the fifth embodiment of the present invention;

FIG. 22 is an example of calculating N' and R'.

DETAILED DESCRIPTION OF THE PREFERRED EMBODIMENTS

Figure 1:
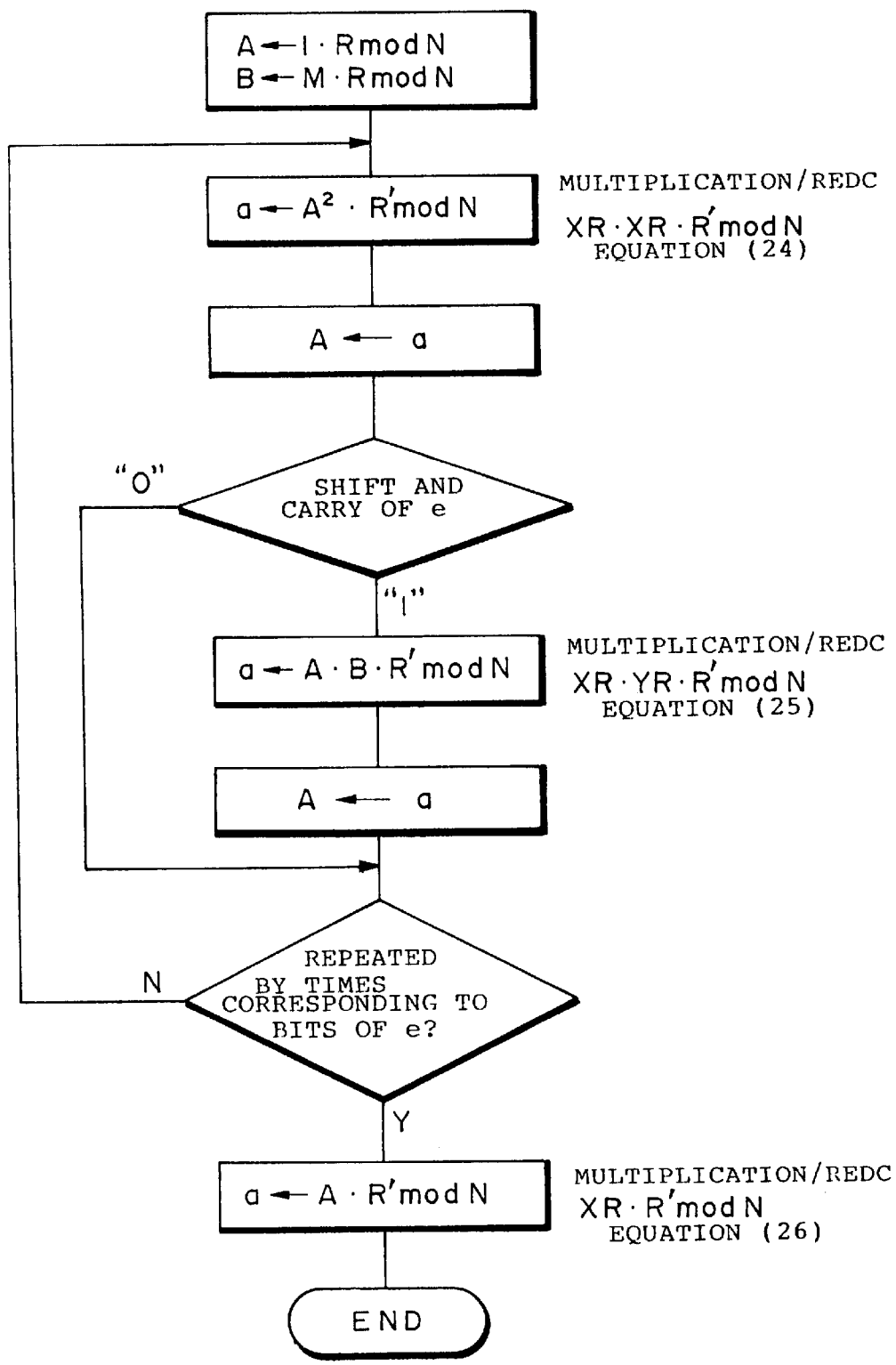
FIG. 1 is a flow chart in the present invention.
Figure 2:
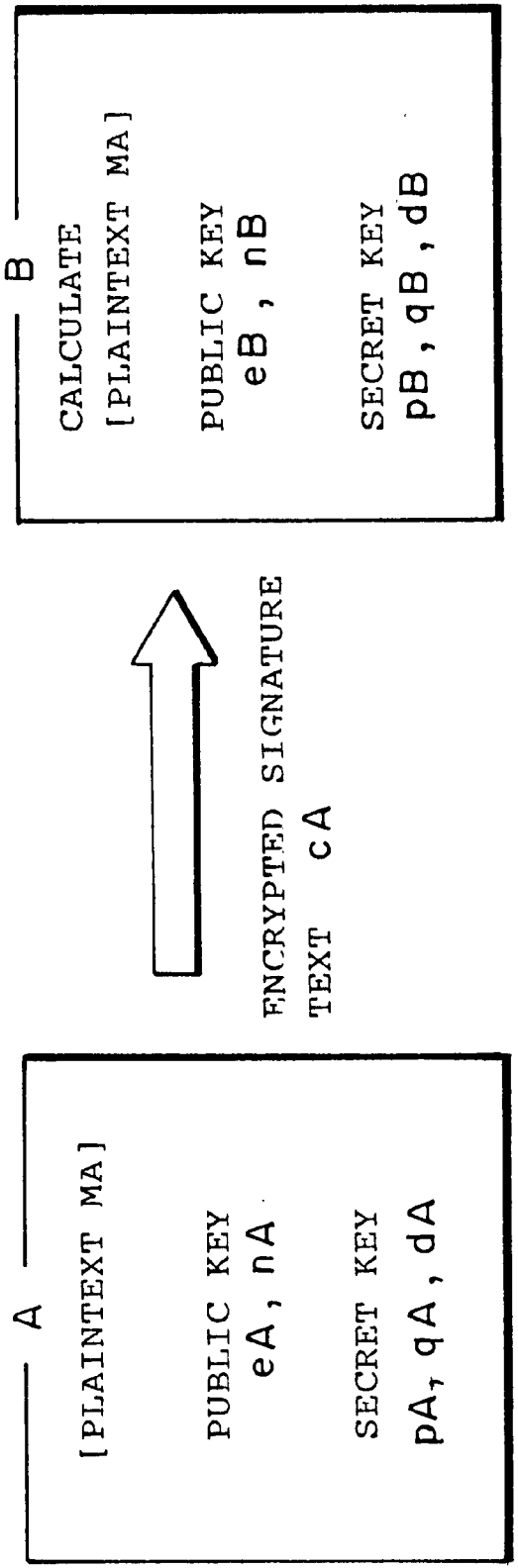
FIG. 2 is a diagram for explaining a definite example of processing of ciphertext.

In the modulo exponentiation arithmetic, the procedure of performing the basic modular arithmetic is very complicated and accordingly the arithmetic circuit is made large as described above. Thus, Montgomery has proposed a scheme for obtaining a solution of a modular arithmetic by performing "multiplication" and simple bit string process without performing the modular arithmetic in the general manner as described above. The present invention basically utilizes the Montgomery's proposed scheme to perform the arithmetic operation and accordingly the Montgomery's proposed scheme is now described in brief, while measures for shortening an operation time in each arithmetic operation are characteristic of the present invention.

In the modular arithmetic, R is defined as an exponent of 2 which is slightly larger than modulus N and an inverse value of R in the "multiplication modN" [means that a remainder of (a value×a value)/(value N) is calculated] is defined as R' (R×R'modN=1 is effected). Further, N' for satisfying the relation of R×R'−N×N'=1 and 0<N'<R is defined (N' is an inverse value of N in the "Montgomery's arithmetic scheme"). At this time, for example, when the modular arithmetic in the form of M(X)=XmodN is performed, the form is substituted by the following form:

$$M'(X) = X \times R' \bmod N \quad (18)$$

Thus, when a calculation method of a function REDC(X) shown in the following flow 2 is performed, the solution of the modular arithmetic can be obtained without dependence on the general method (multiplication and division are merely performed) as described above. However, the flow 2 is a flow for calculating a solution of the modular arithmetic and is not a flow for calculating a solution of the modulo exponentiation arithmetic. The solution of the equation (18) is t or t−N obtained by the above function.

[FLOW 2]
FUNCTION REDC(X):

function REDC(X)

$$m = (X \bmod R) \times N' \bmod R \quad (19)$$

$$t = (X + m \times N)/R \quad (20)$$

if $t < N$ return $t$ ($t$: result)     (21)

else return $t - N$ ($t - N$: result)     (22)

The above function includes the multiplication using arithmetic elements N and N' and the division using arithmetic element R. Since $R=2^n$ is defined, the division using R has a quotient which is a value exceeding $2^n$ of a dividend and a remainder which is a value smaller than $2^n$. Accordingly, the modular arithmetic of the equation (19) merely examines a value smaller than $2^n$ basically and the division of the equation (20) merely examines a value equal to or larger than $2^n$ basically. That is, the solution of the modular arithmetic can be obtained only by the multiplication and the addition without substantial execution of the division (modular arithmetic).

For reference, the relation of m, R and N are now described using the equations (19) and (20).

In the equation (19), $$\begin{aligned} m \times N &= ((X \bmod R) \times N' \bmod R) \times N \\ &= X \times N \times N' \bmod R \\ &= X \times (R \times R' - 1) \bmod R \\ &= X \times R \times R' \bmod R - X \bmod R \\ &= X \bmod R \end{aligned}$$

$$\begin{aligned} X + m \times N &= X + (-X \bmod R) \\ &= 0 \bmod R \end{aligned}$$

This equation means that a remainder is equal to 0 when X+m×N is divided by R, that is, X+m×N can be divided by R without a remainder.

Since X+m×N is a sum of "X" and "multiplication of N", (X+m×N)modN

==XmodN+m×NmodN

==XmodN

Accordingly, from the equation (20)

t×RmodN

==XmodN

When both sides are multiplied by R', t×R×R'modN

==tmodN

==X×R'modN

If X of the above equation X×R'modN is a multiplier value after calculation of modN or modR (described later),

X<N×N<R×N<R×R

Since mn is an executed result of modR, m<R. Accordingly, m×N<R×N

Since X<R×N,

X+m×N<R×N+R×N=2R×N

Accordingly, the following equations are effected.

t=(X+m×N)/R<2N t<2N

If t is larger than N, N is subtracted from both sides of the above equation to obtain the following equation.

$t-N<N$

It is understood from this equation that t−N is a value subjected to modN.

Further, calculation of $t=(X+m\times N)/R$ of the equation (20) and completion of calculation of t are now described supplementarily.

X+m×N is necessarily a multiple of R and accordingly, for example, when $R=2^{576}$, values less than 576 bits of X+m×N are all 0. Thus, calculation of t of the equation (20) is classified into the following two manners.

(i) When X is not a multiple of R;

bit strings of X+m×N and R are expressed as an image as follows:

R=1000 . . . 0000
X=???????? . . . ????
m×N=???????? . . . ????
X+m×N=??????000 . . . 0000

In the calculation of the equation (20), since t is necessarily obtained as an integer value, X+m×N becomes a multiple of R. Accordingly, X+m×N is as the above bit string image. The underlined portion is a solution of t. The reason is that since X+m×N is a multiple of R, an addition result of X and m×N less than R should be necessarily 0 and values indicated by ? are not all 0 originally, so that any carry to the figure exceeding R should be generated in the course of addition. Accordingly, the values of X and m×N less than R are neglected and the following calculation is made to obtain the solution.

t=(value of X above R)+(value of m×N above R)+1

(ii) When X is a multiple of R;

bit strings of X and R are expressed as an image as follows:

R=1000 . . . 0000
X=?????000 . . . 0000

At this time, XmodR of the equation (19) is 0 and accordingly m=0. If m=0, calculation of the equation (20) is t=X/R. Since an integer value is necessarily obtained as t, the solution can be obtained by the following calculation.

t=(value of X above R)

Judgment as to whether X is a multiple of R or not can be made on the basis of whether a value of X less than R is 0 or not. This means that calculation for all of the bit length of X is not required in the calculation of t, so that a calculation amount and a calculation time can be reduced.

With respect to completion of calculation of t, the calculation result of the function REDC(X) is a value in the range of 0<t<2N and when N<t, calculation of t−N must be made again as shown in the flow 2. However, with respect to the calculation result t of the function REDC(X) performed on the way of the modulo exponentiation arithmetic, when it is within the range of t<R even if there is the relation of N<t, the subsequent calculation may be made as it is. The reason is that N value left at this process is removed by the modular arithmetic performed later.

When it is assumed that the calculation result on the way of the modulo exponentiation arithmetic is MmodN=S, the following relation is effected.

$M=k1\times N+S=(k1-1)\times N+N+S$

Figure 3:
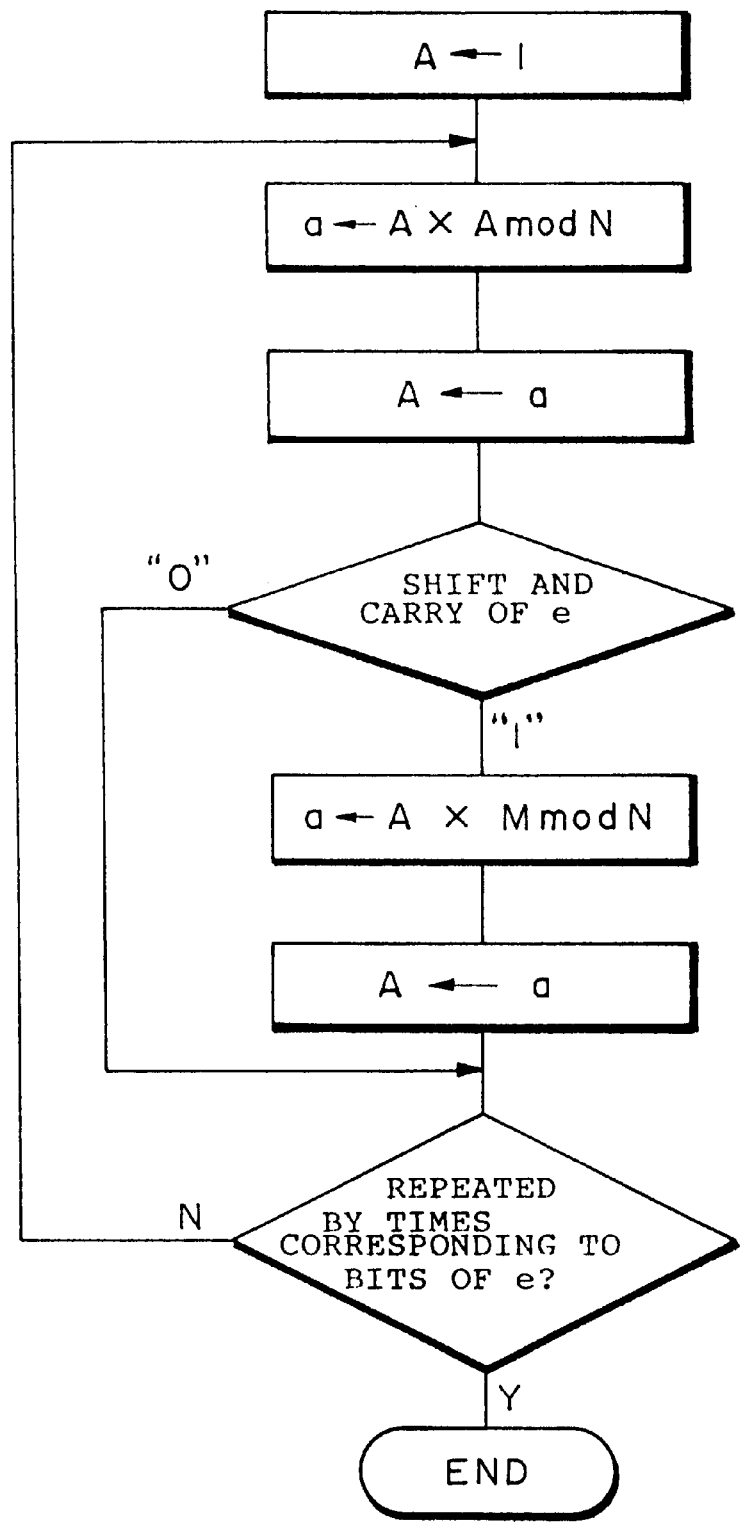
FIG. 3 is a flow chart showing a modulo exponentiation arithmetic.

Accordingly, when it is considered that N+S is left in the modular arithmetic at this time, the following process is performed in the next modular arithmetic, for example, $A^2$modN (refer to FIG. 3) of the modulo exponentiation arithmetic to thereby perform the modular arithmetic again.

M1=A×A=(N+S)×(N+S)

$=N^2+2\times N\times S+S^2$

Thus,

M1modN=$(N^2+2\times N\times S+S^2)$modN $=S^2$modN

The above equation means that N value left at the previous modular arithmetic is removed. Further, even when M1 is calculated in the modulo exponentiation arithmetic of A×MmodN, the similar result is obtained. Even in the Montgomery's method, it comes to the same thing.

For simplification, description is made using an actual numerical value of a short bit length by way of example.

When it is assumed that N=13(1101), R=(10000) and t=15(1111) which has been obtained in the last calculation of the function REDC(X), these values have the relation of N=<t<R<2N. Bit 4 of t at this time is "0", while a pure solution of the modular arithmetic is not obtained as a value of t itself yet. However, since t does not exceed the bit length of N, it is appropriate as a substitution value in the next modulo exponentiation arithmetic of A×A×R'modN or A×M×R'modN. That is, since result values of the multiplication of A×A and A×M performed next do not exceed a prescribed bit length (in the above example of the numerical value, 4 bits×2=8 bits), the calculation of "multiplication R'modN" having the prescribed bit length can be performed continuously.

t can be expressed as t=15=13+2=N+2. This means that the value of t obtained by the last function REDC(X) is "the value having N which has been left" in the calculation of modN. When the value of t is substituted for A as it is, A×A×R'modN is calculated as follows.

$$A \times A \times R'\mathrm{mod}N = (N+2) \times (N+2) \times R'\mathrm{mod}N$$

$$= (N^2 + 4N + 4) \times R'\mathrm{mod}N$$

$$= N^2 \times R'\mathrm{mod}N + 4N \times R'\mathrm{mod}N + 4 \times R'\mathrm{mod}N$$

$$= 4 \times R'\mathrm{mod}N$$

This has the same result as the case where A×A×R'modN is calculated with a pure solution t=2 of the modN arithmetic instead of the value of t obtained by the last function REDC(X) and which is not t=N+2.

ACTUAL EXAMPLE

Calculation of M'(X)=X×R'modN for X=44123, R=$2^8$ and N=199:

From the relation of R×R'modN=1 and R×R'−N×N'=1, R'=7 and N'=9. Accordingly, M'(X)=44123×7mod199=13=0Dh should be effected. The function REDC(X) is used to obtain the above solution.

From X=44123=AC5Bh, R=100h, N=199=C7h and N'=9h, (Function REDC(X))

$$m = (X\mathrm{mod}R) \times N'\mathrm{mod}R = 5Bh \times 9h\mathrm{mod}R = 333h\mathrm{mod}R$$

$$= 33h$$

$$t = (X + m \times N)/R = (AC5Bh + 33h \times C7h)/R$$

$$= D400h/R = D4h$$

A pure solution is t−N=D4h−C7h=0Dh , while t×t× R'modN is executed as it is (next equation 1).

1. for $t = D4h : t \times t = D4h \times D4h = AF90h$
$m = (X \bmod R) \times N' \bmod R = 90h \times 9h \bmod R$
$= 510h \bmod R = 10h$
$t = (X + m \times N)/R = (00AF9h + F1h \times C7h)/R$
$= \underline{BC}00h/R = \underline{BCh}$ 2. for $t = 0Dh : t \times t = 0Dh0 \times Dh = 00A90h$
$m = (X \bmod R) \times N' \bmod R = A9h \times 9h \bmod R$
$= 5F1h \bmod R = F1h$
$t = (X + m \times N)/R = (00AF9h + F1h \times C7h)/R$
$= \underline{BC}00h/R = \underline{BCh}$ The calculation results of the above equations 1 and 2 have the same values as indicated by underline.

The above is important for reduction of the operation time. That is, when the most significant bit of N is bit(n−1), t−N is performed for bit(n)−1 of obtained t and the subsequent arithmetic may be performed for bit(n)=0.

Generally, for the modulo exponentiation arithmetic having an operand of 576 bits in length, $R=2^{576}$. At this time, when the calculation result of the equation (20) exceeds 576 bits (when an overflow of digit of 576 bits occurs), t>=R. Further, calculation of t−N in this case is performed by the following equation.

t−N=(value of lower 576 bits of t)+(inverted value of N)+1

Since the value of N in the cryptograph algorithm is odd, the sum of the inverted value of N and 1 is obtained by calculating the inverse of N and changing the least significant bit thereof to 1.

The function REDC for performing the Montgomery's arithmetic shown in the Flow 2 merely obtains the solution of the Montgomery's arithmetic. That is, as shown in the equation (18), in order to facilitate the calculation, a peculiar numerical value of R' is used. In order to obtain the solution of the equation using the multiplication modN form which does not include R', it is necessary to return the solution of the Montgomery's arithmetic shown in the Flow 2 to numerical value which does not include R' by means of any operation.

In the present invention, the following property is utilized to cancel the value of R' peculiar to the Montgomery's arithmetic.

In M'(X)=X×R'modN,
when X is (X×R),

M'(X×R)=(X×R)R'modN=XmodN and when X is (X×RmodN),

M'(X×RmodN)=(X×RmodN)R'modN=XmodN

In other words, by applying the Montgomery's arithmetic to the form of ?×R or ?×RmodN, R' peculiar to the Montgomery's arithmetic is removed to be changed to the form of ?modN.

Thus, when this property is applied to the modulo exponentiation arithmetic using the iterative square and multiplication method shown in the Flow 1, the solution of the modulo exponentiation arithmetic is obtained as shown in the Flow 3. Exactly speaking, by performing the Flow 2 in each of the modN arithmetic of equations (24), (25) and (26) shown in the Flow 3, solutions in the equations (24), (25) and (26) are obtained easily, so that the solution of the modulo exponentiation arithmetic using the Flow 3 is obtained easily.

[FLOW 3]
begin $A = 1 \times R \bmod N = R \bmod N$  (23)

for $i = k - 1$ down to 0 do begin $A = A^2 \times R' \bmod N$  (24)

if $ei = 1$ then $A = A \times (M \times R \bmod N) \times R' \bmod N$  (25)

end $A = A \times R' \bmod N$  (26)

end

Large differences between the Flow 1 and the Flow 3 reside in that in the equation (23) the initial value stored in the register A is not 1 and RmodN(1×RmodN) is stored in consideration of the later Montgomery's arithmetic, the equation (25) using the value of M×RmodN instead of M of the equation (17), the equation (26) being newly performed. By storing RmodN in the register A previously, R' of the equations (24), (25) and (26) is removed. The iterative square and multiplication method of the Flow 3 is expressed by the flow chart as shown in FIG. 1.

Prior to execution of the arithmetic, RmodN, M×RmodN and N' required previously in FIG. 1 must be obtained.

[for RmodN]

In the modulo exponentiation arithmetic used in the RSA cryptograph or the like, the most significant bit $b^{n-1}$ and the least significant bit $b^0$ of "N" are 0. Accordingly, R at this time is selected to be $2^n$. Thus, RmodN=R−N. R−N can be easily calculated by obtaining the inverse of N and changing the least significant bit thereof to 1.

[for N']

From the relation of R×R'modN=1, R×R'−N×N'=1, O<R' and N'<R, the following relation an be derived.

R'<N', N'−R<R−N

[for M×RmodN]

By previously obtaining $R^2$modN, M×RmodN can be obtained by the following calculation using the Montgomery's arithmetic.

$M \times (R^2 \bmod N) \times R' \bmod N$ $== M \times R^2 \times R' \bmod N$ $== M \times R \bmod N$ For example, when $R=2^{125}$ is assumed, $2^{513} \bmod N = 2 \times 2^{512} \bmod N == 2 \times (R \bmod N) \bmod N = A$ When the following Flow 4 is executed using the above A as an initial value, the solution of $R^2 \bmod N$ can be obtained.

[FLOW 4]
    begin
        for i=1 to 9
            begin M(A,A)=A×A×R'modN
            end
    end The calculation process in the Flow 4 is as follows:

i=1: $A=2^{513} \bmod N$   $M(A,A)=2^{513} \times 2^{513} \times 2^{-512} \bmod N == 2^{514} \bmod N$ i=2: $A=2^{514} \bmod N$   $M(A,A)=2^{514} \times 2^{514} \times 2^{-512} \bmod N == 2^{516} \bmod N$ i=3: $A=2^{516} \bmod N$   $M(A,A)=2^{516} \times 2^{516} \times 2^{-512} \bmod N == 2^{520} \bmod N$ i=4: $A=2^{520} \bmod N$   $M(A,A)=2^{520} \times 2^{520} \times 2^{-512} \bmod N == 2^{528} \bmod N$ i=5: $A=2^{528} \bmod N$   $M(A,A)=2^{528} \times 2^{528} \times 2^{-512} \bmod N == 2^{544} \bmod N$ i=6: $A=2^{544} \bmod N$   $M(A,A)=2^{544} \times 2^{544} \times 2^{-512} \bmod N == 2^{576} \bmod N$ i=7: $A=2^{576} \bmod N$   $M(A,A)=2^{576} \times 2^{576} \times 2^{-512} \bmod N == 2^{640} \bmod N$ i=8: $A=2^{640} \bmod N$   $M(A,A)=2^{640} \times 2^{540} \times 2^{-512} \bmod N == 2^{769} \bmod N$ i=9: $A=2^{768} \bmod N$   $M(A,A)=2^{768} \times 2^{568} \times 2^{-512} \bmod N == 2^{1024} \bmod N$ The final result (i=9) is the solution of $R^2 \bmod N$ to be obtained.

After the $R^2 \bmod N$ obtained in this calculation is multiplied by M, the Flow 2 is executed using the multiplied result as X in the Flow 2 to thereby obtain M×RmodN.

As described above, the calculation in the Flow 2 includes the multiplication using N and N' and the division using R. Accordingly, the solution can be obtained only by the multiplication and the addition without substantial execution of the division (modular arithmetic).

As described above, values of RmodN, M×RmodN and N' required previously in the flow chart of FIG. 1 can be prepared.

The flow chart of FIG. 1 is now executed.

First, the previously obtained RmodN is stored in a register A (The register A may be a memory, for example. The same applies hereinafter.) as an initial value. The previously obtained M×RmodN is stored in a register B. The reason why M×RmodN is stored in the register B is that M×RmodN in the equation (25) used in the later process is ensured.

Then, the equation (24) is executed. That is, the Montgomery's arithmetic $A^2 \times R' \bmod N$ is executed. The equation (24) is obtained by executing the Flow 2 as described above. A value obtained by squaring the value stored in the register A is calculated as X in the equation (19) to obtain m. As described above, this calculation is performed by the modular arithmetic using the multiplication and R. Since $R=2^n$ is defined, the modular arithmetic using R may merely examine a value smaller than or equal to $2^n$ of the dividend. Then, the obtained m is used to execute the equation (20). A value obtained by squaring the value stored in the register A is calculated as X in the equation (20) to obtain t. As described above, this calculation is performed by multiplication and addition and division using R. Since $R=2^n$ is defined, the division using R may merely examine a value larger than or equal to $2^n$ of the dividend. This calculation result is stored in the register A.

Then, the value stored in register a is stored in the register A.

Judgment of bits of the exponent e is made. If bit is 1, the equation (25) is executed. That is, the Montgomery's arithmetic A×B×R'modN is executed. The equation (25) is obtained by executing the Flow 2 as described above. A product of the value stored in the register A and the value stored in the register B is calculated as X in the equation (19) to obtain m. The obtained m is used to execute the equation (20). A product of the value stored in the register A and the value stored in the register B is calculated as X in the equation (20) to obtain t. The calculation result is stored in the register a. The calculation result stored in the register a is stored in the register A.

If bit of the exponent e is 0, the calculation of the equation (25) is not performed and the process proceeds to next step.

Judgment as to whether the above arithmetic operation (execution of the equations (24) and (25)) is performed for all bits of the exponent e or not is made. If it is not performed, the process is returned to the step in which the equation (24) is performed, while if it is performed, the equation (26) is then performed. The equation (26) is obtained by executing the Flow 2 as described above. Calculation is made using the value stored in the register A as X in the equation (19) to obtain m. Then, the obtained m is used to execute the equation (20). Calculation is made using the value stored in the register A as X in the equation (20) to obtain t.

Thus, the series of operations described above is completed.

The solution of the modulo exponentiation arithmetic described above is summarized as follows.

1. Modulo exponentiation arithmetic ($M^e \bmod N$)
2. Iterative square and multiplication method is used (iteration of A×AmodN and A×MmodN)
3. Calculation of A×AmodN and A×MmodN is substituted by the Montgomery's method since the division is complicated (Montgomery's method: M'(X)=X×R'modN)
4. M'(X)=X×R'modN can be realized using the function REDC(X). (The function REDC which can converts the arithmetic of modN to the form of modr to thereby avoid the complexity of the division.)

A hardware for actually realizing the present invention is now described with reference to the accompanying drawings.

Figure 4:
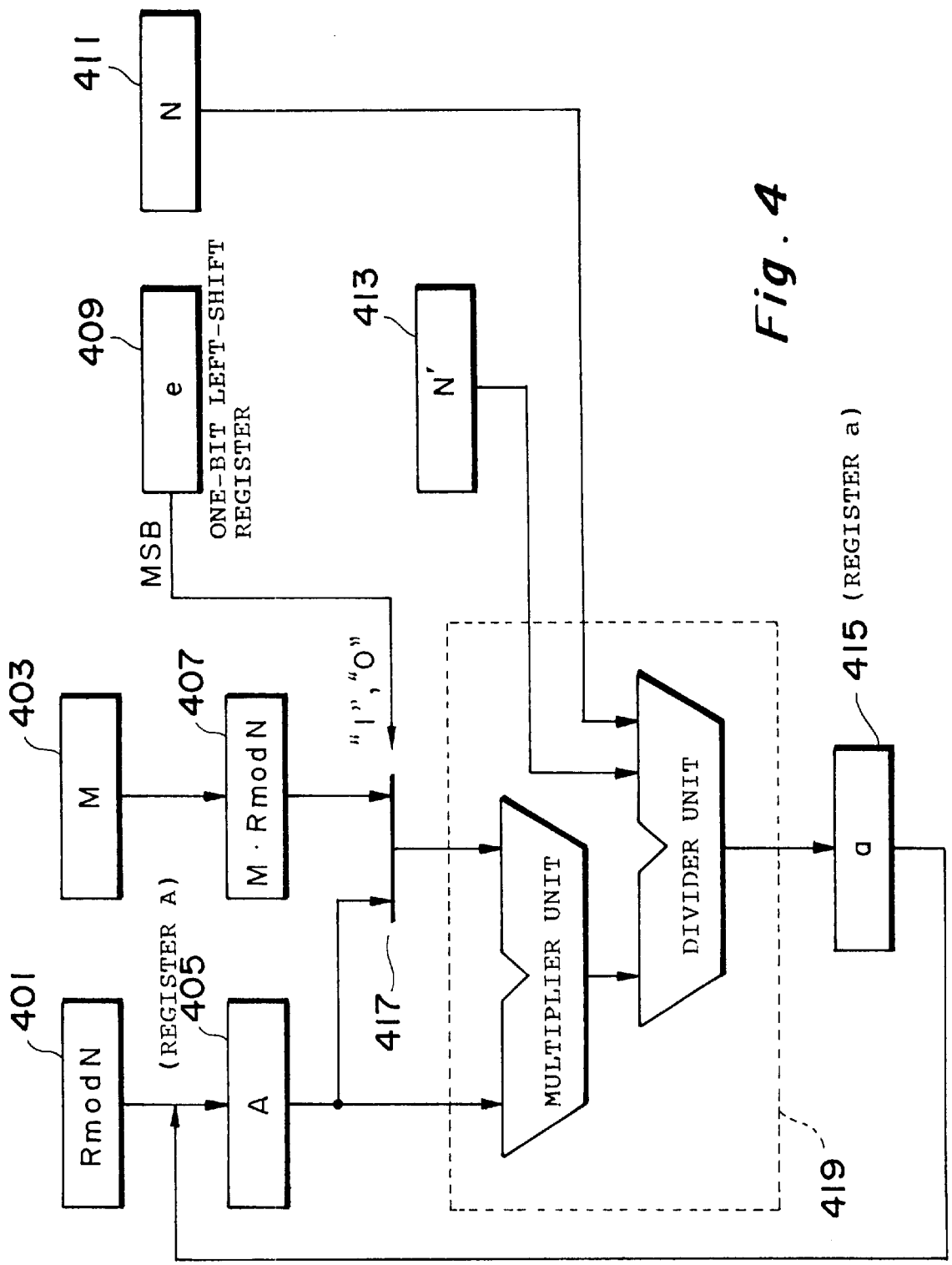
FIG. 4 is a block diagram schematically illustrating a hardware of the present invention.

FIG. 4 is a block diagram schematically illustrating an actual hardware.

In FIG. 4, numerals 401, 403, 405, 407, 409, 411, 413 and 415 denote memories or registers. Values described in respective boxes are stored in the registers 401, 403, 405, 407, 409, 411 and 413. The register 405 corresponds to the register A described in FIG. 1 and the register 415 corresponds to the register a. A selector 417 serves to transfer any output of the register 407 or the register 405 to an arithmetic unit 419 in accordance with an indication from a one-bit left-shift register 409 in which the exponent e is stored. The selector 417 corresponds to a portion for executing the "shift and carry of e" in FIG. 1. That is, when the exponent portion e is 1, M×RmodN is transferred to the arithmetic unit and when the exponent portion e is 0, it is not transferred. At the initial stage of the flow chart shown in FIG. 1, when $A^2$ is obtained, an output of the register 405 is transferred to the arithmetic unit.

The arithmetic unit 419 includes a multiplier unit and a divider unit. The arithmetic unit 419 executes multiplication and the function REDC(X).

The hardware for realizing the present invention is now described in detail with reference to the drawings.

First Embodiment (Structure)

The calculation method of the modulo exponentiation arithmetic $M^e$modN performs the two kinds of arithmetic operations of $A^2 \times R'$modN . . . (24) and $A \times B \times R'$modN . . . (25) (B corresponds to a portion in which "M×RmodN" of the equation (25) is positioned) in the Montgomery's arithmetic method described above repeatedly on the basis of a prescribed procedure in accordance with contents of bit values of the exponent "e" and finally performs the following equation (26) as described in FIG. 1 and the Flow 3.

$$A \times 1 \times R' \text{modN} \qquad (26)$$

Accordingly, by providing an arithmetic unit (hereinafter referred to as a coprocessor) for performing the three kinds of modular arithmetics, the coprocessor can be used (the repetitive procedure of arithmetic may be realized by a control method of any of software or hardware) to obtain the solution of the modulo exponentiation arithmetic.

The present invention concerns the coprocessor having the three kinds of modular arithmetics or three arithmetic modes.

Figure 5:
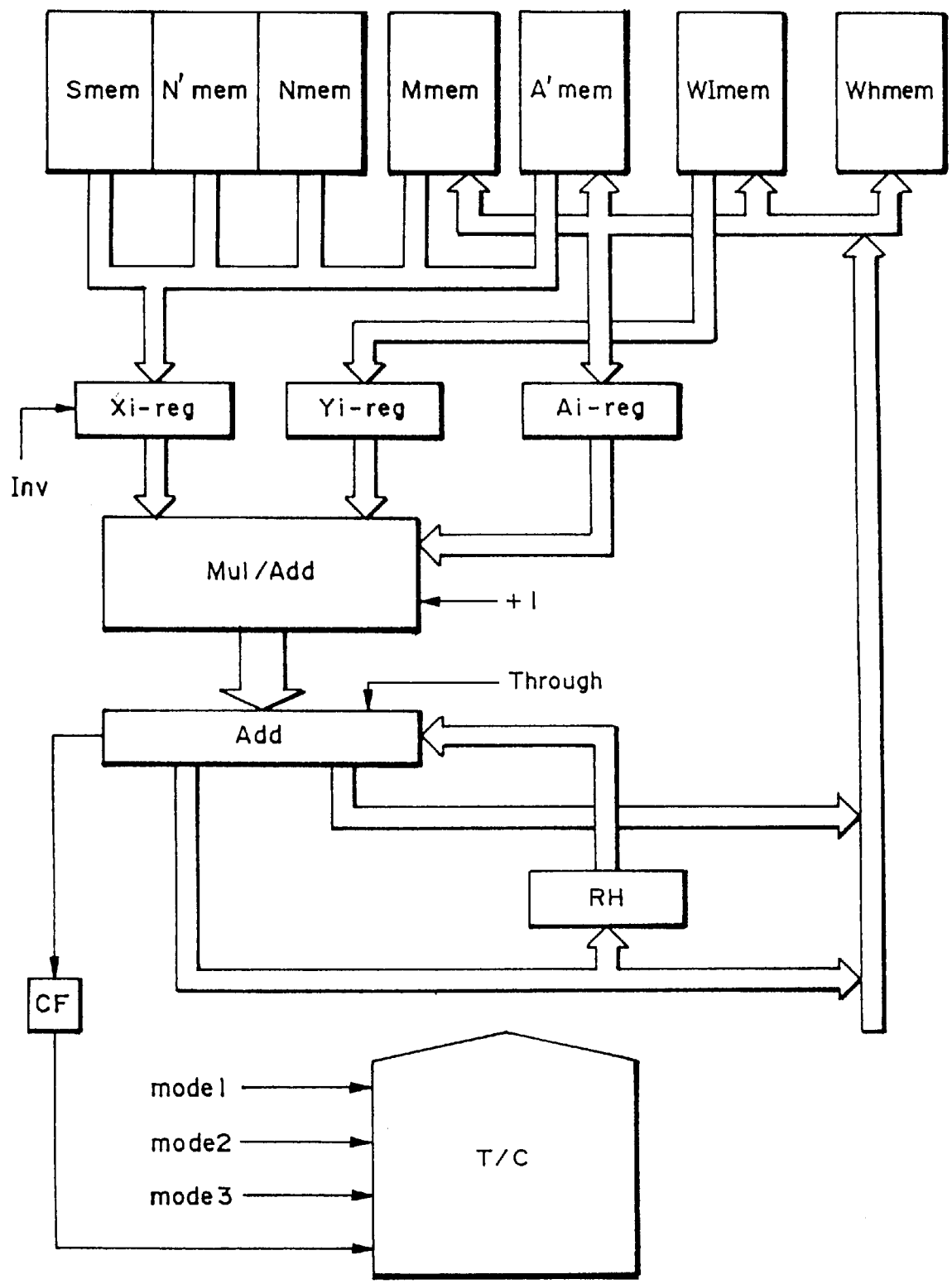
FIG. 5 is a block diagram schematically illustrating a first embodiment of the present invention.

FIG. 5 is a diagram schematically illustrating a modular arithmetic coprocessor according to a first embodiment of the present invention.

In FIG. 5, thick arrowed lines connecting blocks represent buses for transferring data.

The modular arithmetic coprocessor of the present invention comprises a timing/control circuit T/C for supplying operation timings of the whole coprocessor and control signals corresponding to a kind of the arithmetic operations of three kinds to various circuits in the arithmetic unit, and a plurality of arithmetic value memories Smem, N'mem, Nmem, Mmem, A'mem, Wlmem and Whmem for storing arithmetic values of the Montgomery's method. Further, the modular arithmetic coprocessor of the present invention comprises a high-speed multiplier/adder Mul/Add for performing multiplication and addition, a high-speed adder Add for performing addition, a multiplier storage register Xi-reg for storing a multiplier value, a multiplicand storage register Yi-reg for storing a multiplicand, an augend storage register Ai-reg for storing an augend, and a register RH for storing an upper digit of a value produced by the high-speed adder Add.

The high-speed adder Add, the multiplier storage register Xi-reg, the multiplicand storage register Yi-reg and the augend storage register Ai-reg have the function of temporarily storing a value read out from the arithmetic value memories and corresponding to an input bit length of the high-speed multiplier/adder Mul/Add.

The high-speed multiplier/adder Mul/Add is a multiplier/adder of a specific bit length which is supplied with an output value of the register Xi-reg and an output value of the register Yi-reg as input value in the multiplication operation and is supplied with an output value of the register Ai-reg as input value in the addition operation. An output of the high-speed multiplier/adder is inputted to the high-speed adder Add of next stage as an addition input value.

The high-speed adder Add is an adder of a specific bit length which performs addition of an output value of the high-speed multiplier/adder Mul/Add and an output value of the register RH. The upper digit of the output of the high-speed adder Add is supplied to the register RH or the arithmetic value memories and the lower digit thereof is supplied to the arithmetic value memories.

(Operation)

Operation of the circuit shown in FIG. 5 is now described.

[Realization Method of $A^2 \times R'$modN . . . (24)]

A value of A is stored in both the arithmetic value memories A'mem and Wlmem, a value of N' in the Montgomery's method is stored in the arithmetic value memory N'mem and a value of N is stored in the arithmetic value memory Nmem. Since the values of N and N' are keys for encryption/decryption, the values are determined by the cryptograph system operator to the transmitting/receiving person of data. A value of R is determined from the value of N. The value of A is determined by executing RmodN as described above.

A mode 1 signal is supplied to the timing/control circuit T/C to thereby execute the equation (24) of $A^2 \times R'$modN as described below.

Calculation of A×A is first performed.

A value corresponding to the input bit length of the high-speed multiplier/adder Mul/Add is taken in the register Xi-reg from the arithmetic value memory A'mem. Similarly, a value corresponding to the input bit length of the high-speed multiplier/adder Mul/Add is taken in the register Yi-reg from the arithmetic value memory Wlmem.

Figure 6:
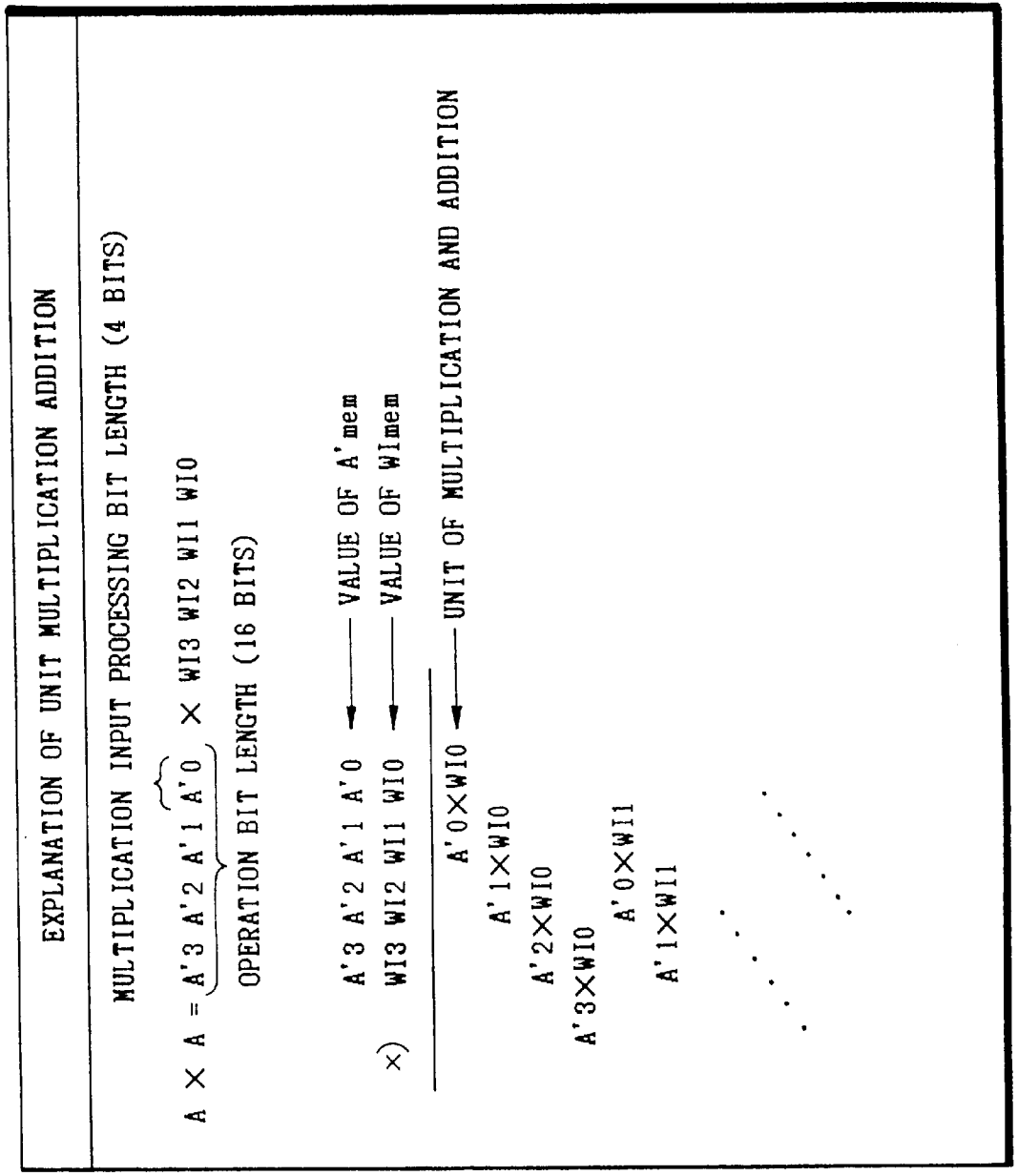
FIG. 6 is a diagram for explaining unit of multiplication and addition.

As shown in FIG. 6, for the multiplication operation, when the bit length (for example, 16 bits) of the operation value exceeds the multiplication input processing bit length (for example, 4 bits) of the high-speed multiplier/adder Mul/Add, a unit of multiplication and addition are repeated by the number of times (4×4=16 times) of operation corresponding to the bit length of the operation value.

The above operation is expressed in detail by hardware image as shown in FIG. 7.

This arithmetic operation means that values obtained by multiplying values stored in addresses A'3, A'2, A'1 and A'0 of the arithmetic value memory A'mem by values stored in addresses Wl3, Wl2, Wl1 and Wl0 are stored in addresses Wh3, Wh2, Wh1, Wh0, Wl3, Wl2, Wl1 and Wl0 of the arithmetic value memories Whmem and Wlmem.

(Unit of Multiplication and Addition 1)

The value (multiplicand) stored in the address Wl0 of the arithmetic memory Wlmem is taken in the register Yi-reg and the value (multiplier) stored in the address A'0 of the arithmetic value memory A'mem is taken in the register Xi-reg. Then, the high-speed multiplier/adder Mul/Add multiplies the multiplier by the multiplicand and supplies a product thereof to the high-speed adder Add. In this multiplication and addition unit 1, since the digit alignment operation is not required, the addend supplied to the high-speed multiplier/adder Mul/Add from the register Ai-reg is assumed to be 0. (The value of the register Ai-reg is set to 0 or the value stored in the register Ai-reg is adapted not to be supplied to the high-speed multiplier/adder Mul/Add.) Further, a high level signal is supplied to a through terminal of the high-speed adder Add so that contents of the register RH are not added. In the multiplication of the value of the arithmetic value memory A'mem and the value of the arithmetic value memory Wlmem, since the lower digit of the operation result in the unit of multiplication and addition 1 is the least significant digit of the final operation result of this multiplication, the lower digit of the operation result in the unit of multiplication and addition 1 is stored in the least significant address Wl0 of the arithmetic value memory Wlmem as the final operation result of this multiplication. (In FIG. 7, the final operation result is stored in the underlined address.) The upper digit of the operation result of the unit of multiplication and addition 1 is stored in the register RH in order to align the digit in the next unit of multiplication and addition.

(Unit of Multiplication and Addition 2)

The register Yi-reg holds the already stored value (multiplicand) and the register Xi-reg takes in the value (multiplier) stored in the address A'1 of the arithmetic value memory A'mem. Then, the high-speed multiplier/adder Mul/Add multiplies the multiplier by the multiplicand and supplies the product thereof to the high-speed adder Add. In this multiplication and addition unit 2, the addend supplied to the high-speed multiplier/adder Mul/Add from the register Ai-reg is assumed to be 0. (The value of the register Ai-reg is set to 0 or the value stored in the register Ai-reg is adapted not to be supplied to the high-speed multiplier/adder Mul/Add.) A low level signal is supplied to the through terminal of the high-speed adder Add so that contents (the upper digit of the operation result of the multiplication and addition unit 1) of the register RH are added to the output of the high-speed multiplier/adder Mul/Add. The lower digit of the operation result in the unit of multiplication and addition 2 is stored in the least significant address Wh0 of the arithmetic value memory Whmem. The upper digit of the operation result of the unit of multiplication and addition 2 is stored in the register RH in order to align the digit in the next unit of multiplication and addition.

(Unit of Multiplication and Addition 3)

The register Yi-reg holds the already stored value (multiplicand) and the register Xi-reg takes in the value (multiplier) stored in the address A'2 of the arithmetic value memory A'mem. Then, the high-speed multiplier/adder Mul/Add multiplies the multiplier by the multiplicand and supplies the product thereof to the high-speed adder Add. In this multiplication and addition unit 3, the addend supplied to the high-speed multiplier/adder Mul/Add from the register Ai-reg is assumed to be 0. (The value of the register Ai-reg is set to 0 or the value stored in the register Ai-reg is adapted not to be supplied to the high-speed multiplier/adder Mul/Add.) A low level signal is supplied to the through terminal of the high-speed adder Add so that contents (the upper digit of the operation result of the multiplication and addition unit 1) of the register RH are added to the output of the high-speed multiplier/adder Mul/Add. The lower digit of the operation result in the unit of multiplication and addition 3 is stored in the address Wh1 of the arithmetic value memory Whmem. The upper digit of the operation result of the unit of multiplication and addition 3 is stored in the register RH in order to align the digit in the next unit of multiplication and addition.

(Unit of Multiplication and Addition 4)

The register Yi-reg holds the already stored value (multiplicand) and the register Xi-reg takes in the value (multiplier) stored in the address A'3 of the arithmetic value memory A'mem. Then, the high-speed multiplier/adder Mul/Add multiplies the multiplier by the multiplicand and supplies the product thereof to the high-speed adder Add. In this multiplication and addition unit 4, the addend supplied to the high-speed multiplier/adder Mul/Add from the register Ai-reg is assumed to be 0. (The value of the register Ai-reg is set to 0 or the value stored in the register Ai-reg is adapted not to be supplied to the high-speed multiplier/adder Mul/Add.) A low level signal is supplied to the through terminal of the high-speed adder Add so that contents (the upper digit of the operation result of the multiplication and addition unit 1) of the register RH are added to the output of the high-speed multiplier/adder Mul/Add. The lower digit of the operation result in the unit of multiplication and addition 4 is stored in the address Wh2 of the arithmetic value memory Whmem. The upper digit of the operation result of the unit of multiplication and addition 4 is stored in the address Wh3 of the arithmetic value memory Whmem in order to align the digit in the next unit of multiplication and addition.

(Unit of Multiplication and Addition 5)

The register Yi-reg takes in the value (multiplicand) stored in the address Wl1 of the arithmetic value memory Wlmem, the register Xi-reg takes in the value (multiplier) stored in the address A'0 of the arithmetic value memory A'mem, and the register Ai-reg takes in the value (addend) stored in the address Wh0 of the arithmetic value memory Whmem. Then, the high-speed multiplier/adder Mul/Add multiplies the multiplier by the multiplicand and adds the addend to this multiplication result to supply the added result to the high-speed adder Add. In this unit of multiplication and addition 5, a high level signal is supplied to the through terminal of the high-speed adder Add so that the contents (upper digit of the operation result of the unit of multiplication and addition 4) of the register RH are not added. The lower digit of the operation result of this multiplication and addition unit 5 is stored in the address Wl1 of the arithmetic value memory Wlmem. The upper digit of the operation result of this multiplication and addition unit 5 is stored in the register RH in order to align the digit in the next unit of multiplication and addition.

(Unit of Multiplication and Addition 6)

The register Yi-reg holds the already stored value (multiplicand), the register Xi-reg takes in the value (multiplier) stored in the address A'1 of the arithmetic value A'mem and the register Ai-reg takes in the value (addend) stored in the address Wh1 of the arithmetic value memory Whmem. Then, the high-speed multiplier/adder Mul/Add multiplies the multiplier by the multiplicand and adds the addend to this multiplication result to supply the added result to the high-speed adder Add. In this unit of multiplication and addition 6, a low level signal is supplied to the through terminal of the high-speed adder Add so that the contents (upper digit of the operation result of the unit of multiplication and addition 5) of the register RH are added to the output of the high-speed multiplier/adder Mul/Add. The lower digit of the operation result of this multiplication and addition unit 6 is stored in the address Wh0 of the arithmetic value memory Whmem. The upper digit of the operation result of this multiplication and addition unit 6 is stored in the register RH in order to align the digit in the next unit of multiplication and addition.

(Unit of Multiplication and Addition 7)

The register Yi-reg holds the already stored value (multiplicand), the register Xi-reg takes in the value (multiplier) stored in the address A'2 of the arithmetic value A'mem and the register Ai-reg takes in the value (addend) stored in the address Wh2 of the arithmetic value memory Whmem. Then, the high-speed multiplier/adder Mul/Add multiplies the multiplier by the multiplicand and adds the addend to this multiplication result to supply the added result to the high-speed adder Add. In this unit of multiplication and addition 7, a low level signal is supplied to the through terminal of the high-speed adder Add so that the contents (upper digit of the operation result of the unit of multiplication and addition 6) of the register RH is added to the output of the high-speed multiplier/adder Mul/Add. The lower digit of the operation result of this multiplication and addition unit 7 is stored in the address Wh1 of the arithmetic value memory Whmem. The upper digit of the operation result of this multiplication and addition unit 7 is stored in the register RH in order to align the digit in the next unit of multiplication and addition.

(Unit of Multiplication and Addition 8)

The register Yi-reg holds the already stored value (multiplicand), the register Xi-reg takes in the value (multiplier) stored in the address A'3 of the arithmetic value A'mem and the register Ai-reg takes in the value (addend) stored in the address Wh3 of the arithmetic value memory Whmem. Then, the high-speed multiplier/adder Mul/Add multiplies the multiplier by the multiplicand and adds the addend to this multiplication result to supply the added result to the high-speed adder Add. In this unit of multiplication and addition 8, a low level signal is supplied to the through terminal of the high-speed adder Add so that the contents (upper digit of the operation result of the unit of multiplication and addition 7) of the register RH are added to the output of the high-speed multiplier/adder Mul/Add. The lower digit of the operation result of this multiplication and addition unit 8 is stored in the address Wh2 of the arithmetic value memory Whmem. The upper digit of the operation result of this multiplication and addition unit 8 is stored in the address Wh3 of the arithmetic value memory Whmem.

The units of multiplication and addition 9 to 16 are performed as shown in FIG. 7 in accordance with the unit of multiplication and addition described above. Thus, A×A, that is, the value obtained by multiplying the value stored in the arithmetic value memory A'mem by the value stored in the arithmetic value memory Wlmem is stored in the form of Whmem-Wlmem ("-" is not a mark representing subtraction).

For example, in the case of the calculated result 6572h of 64h×F5h in calculation of 8 bits×8 bits, the upper digit 65h thereof is stored in the arithmetic value memory Whmem and the lower digit 72h is stored in the arithmetic value memory Wlmem.

Then, the function REDC is used to perform the modular arithmetic using the Montgomery's method. In the Montgomery's method, when the modulo exponentiation arithmetic having the operand length of n bits is performed, $R=2^n$ as described above. There are values of R' and N' having the bit length of n in this relation. Since the value of A×A is stored in the form of Whmem-Wlmem, calculation of m is as follows.

$m = (X \bmod R) \times N' \bmod R$ $= (Whmem - Wlmem) \bmod R \times N' \bmod R$ where since (XmodR) is a remainder of X divided by R, the value smaller than R is examined, so that the above equation is as follows.

$m = (Wlmem) \times (N'mem) \bmod R$

The above equation indicates a remainder of (Wlmem)×(N'mem) divided by R and accordingly the lower n-bit value of the result obtained by performing (Wlmem)×(N'mem) is m.

More particularly, the value stored in the arithmetic memory Mmem when the calculation of (Wlmem)×(N'mem) is performed in accordance with the calculation of A×A and the result thereof is stored into both of the arithmetic value memory A'mem and the arithmetic value memory Mmem in the form of A'mem-Mmem is m.

Further, calculation of t is as follows.

$t = (X + m \times N) / R$ $= [(Whmem - Wlmem) + (Mmem) \times (Nmem)] / R$

In order to obtain the solution of the above equation, calculation of (Mmem)×(Nmem) is performed in accordance with A×A and the result thereof is stored in both the arithmetic value memories A'mem and Mmem in the form of A'mem-Mmem. Subsequently, the following calculation is performed.

Mmem'1+Wlmem (27) (addition of lower digit)

A'mem'1+Whmem+overflow of (27) (28) (addition of upper digit)

The equation (28) at this time is t to be obtained.

Further, since the value smaller than or equal to R is necessarily 0 and the calculated result of the equation (27) is 0, it is not necessary to store it in the memory. In the calculation of the equation (27), while there is considered the case where overflow of digit occurs, 1 is supplied to terminal (+1) of the high-speed multiplier/adder Mul/Add shown in FIG. 5 at this time in the calculation of the equation (28). It is apparent that the calculations can be performed easily by means of the coprocessor of the present invention.

The value obtained by the equation (28) is stored in both of the arithmetic value memories A'mem and Mmem. Further, when overflow of digit occurs, 1 is written in a carry flag CF.

When the carry flag is 1, it is apparent that there is the relation of t>N and accordingly it is necessary to calculate t−N. This is obtained by performing the following calculation.

$$[(\text{Inverted Nmem}+1)'1]+\text{Wlmem} \tag{29}$$

The inverted Nmem means the inverse of the value stored in Nmem.

Since the value of N stored in the arithmetic value memory Nmem is odd in the cryptograph algorithm, the value of (the inverted Nmem+1) in the equation (29) is obtained by calculating a complement of 1 for Nmem and changing the least significant bit to 1. This operation is realized by supplying 1 to a terminal Inv of the register Xi-reg shown in FIG. 5 (the complement of 1 for the value stored in the register Xi-reg is calculated).

[Realization Method of A×B×R'modN   (25)]

The value of A is stored in the arithmetic value memory Wlmem, the value of B is stored in the arithmetic value memory Smem, the value of N' in the Montgomery's method is stored in the arithmetic value memory N'mem and the value of N is stored in the arithmetic value memory Nmem.

A mode 2 signal is supplied to the timing/control circuit T/C to thereby execute the equation (25) of A×B×R'modN as described below.

Calculation of A×B is first performed.

A value corresponding to the input bit length of the high-speed multiplier/adder Mul/Add is taken in the register Xi-reg from the arithmetic value memory Smem. Similarly, a value corresponding to the input bit length of the high-speed multiplier/adder Mul/Add is taken in the register Yi-reg from the arithmetic value memory Wlmem.

The calculation of A×B is the same as the calculation of A×A described above except that the value supplied to the register Xi-reg is taken from the arithmetic value memory Smem.

Then, the function REDC is used to perform the modular arithmetic using the Montgomery's method.

The calculation method is the same as in the case of A×A and the calculation result is stored in both of the arithmetic value memories A'mem and Wlmem.

When the modulo exponentiation arithmetic is performed, the equations (24) and (25) are calculated repeatedly. However, by using the realization method of the calculation described above, the calculation results of the equations (24) and (25) are stored in both of the arithmetic value memories A'mem and Wlmem. Accordingly, since the initialization of arithmetic values is not required at the beginning of calculation of each equation, the repetitive calculation can be performed smoothly.

[Realization Method of A×R'modN (26)]

The value of A is stored in the arithmetic value memory Wlmem, the value of N' in the Montgomery's method is stored in the arithmetic value memory N'mem and the value of N is stored in the arithmetic value memory Nmem.

A mode 3 signal is supplied to the timing/control circuit T/C to thereby execute the equation (26) of A×R'modN as described below.

In the equation of this time, it is not necessary to execute multiplication of A×?. Accordingly, only the modular arithmetic using the Montgomery's method is performed.

The calculation method of m in the modular arithmetic is substantially the same as in the case of A×A. The value of the arithmetic value memory Wlmem when the calculation result is stored in both of the arithmetic value memories A'mem and Wlmem in the form of A'mem-Wlmem is the value of m.

Further, calculation of t is as follows.

$$t = (X + m \times N)/R$$
$$= [\text{value above R of result of (Wlmem)} \times \text{(Nmem)}] + 1 \quad (30)$$

In the calculation of the equation (26), the above X is A and there is no value above R (it is considered as 0). Accordingly, it is not necessary to perform addition of the value (Whmem) above R as described in the realization method of the equation (24). Further, since (X+m×N) is necessarily a multiple of R, it is not necessary to add the value of X indicated by the second term of the equation (30) and the solution is obtained by "[the value above R of the result of (wlmem)×(Nmem)]+1" instead. This is that the value of A in this calculation is not 0 when the modular arithmetic is used in the cryptograph algorithm.

Accordingly, in the equation (30), calculation of (Wlmem)×(Nmem) is first performed and the calculation result thereof may be stored in the arithmetic value memories A'mem and Wlmem in the form of A'mem-Wlmem. The value in the memory A'mem obtained as the result thereof is the solution to be obtained. (All operations of the modulo exponentiation arithmetic are terminated by the execution of this arithmetic operation and accordingly storing to the arithmetic value memory Wlmem may be omitted.) At the timing of storing the final calculation result at this time in the least significant digit of the arithmetic value memory A'mem, 1 is supplied to the terminal +1 shown in FIG. 5 to execute addition of 1 in the equation (30).

As described above, according to the first embodiment, the multiplier/adder (a multiplier and an adder may be provided separately) having the prescribed bit length is provided as a core of the arithmetic unit and the control signals from the timing/control signal generating circuit are supplied to the circuit disposed at the periphery thereof to thereby be able to realize the modular arithmetic having a long bit length using the Montgomery's method or the modulo exponentiation arithmetic. Further, according to this system, since the core of the arithmetic unit can be configured by the arithmetic unit having a limited (prescribed) bit length, the circuit scale can be made small and it is suitable for LSI.

Second Embodiment (Structure)

Figure 8:
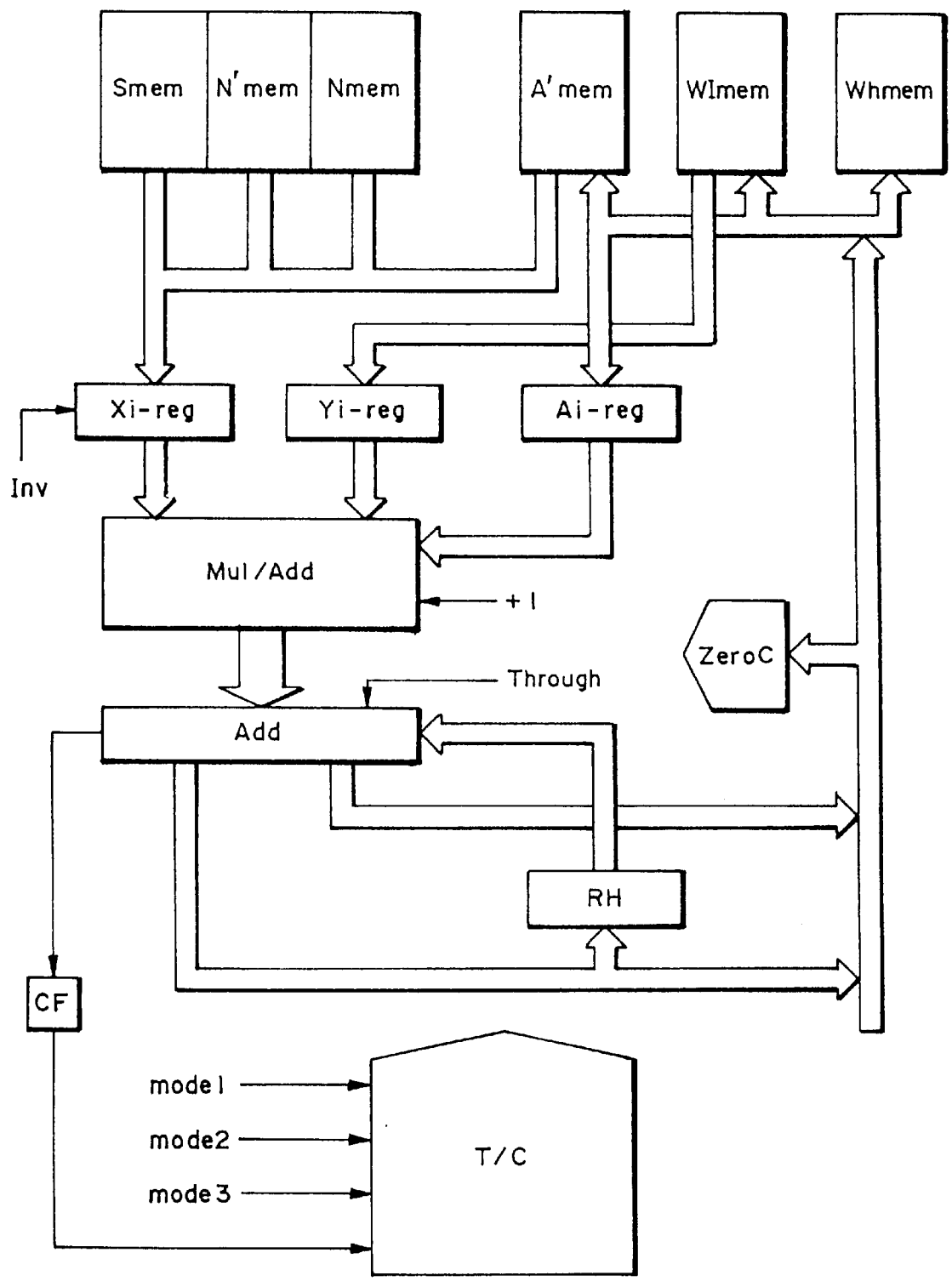
FIG. 8 is a block diagram schematically illustrating a second embodiment of the present invention.

FIG. 8 is a block diagram schematically illustrating a modular arithmetic coprocessor according to a second embodiment of the present invention.

The second embodiment includes, in addition to the configuration of the first embodiment (FIG. 5), a circuit for detecting that an arithmetic value is 0 and controlling the sequence for the next arithmetic operation.

More particularly, this control circuit is represented by ZeroC in FIG. 8. The control circuit ZeroC is a circuit for detecting that an arithmetic value is 0 to control the sequence for the next arithmetic operation and includes an input terminal to which the output signal of the high-speed adder Add is supplied and an output terminal. The control circuit produces from the output terminal a signal for subjecting the timing/control signal generated by the timing/control circuit T/C and the signal for operating the various circuits in the coprocessor to a predetermined control.

(Operation)

In the calculation of the function REDC described in the realization method of the equations (24) and (25) of the first embodiment, the value of X obtained as the result of the previous multiplication can be classified into the following two cases.

(a) When it is a multiple of R
the value (Wlmem) obtained in the previous calculation is 0.

(b) When it is not a multiple of R
the value (Wlmem) obtained in the previous calculation is not 0.

In the embodiment, the control circuit ZeroC detects whether the value less than R of the X value (value of A×A or A×B) is 0 or not and performs the sequence of the subsequent arithmetic operation in accordance with the detected result as follows.

For the case of (a), it is apparent that since XmodR=0, m=0. Accordingly, at this time, it is not necessary to perform calculation of m.

Calculation of t is as follows.

$$t = (X + m \times N)/R = X/R = \text{Whmem} \quad (31)$$

This indicates that the upper digit of the calculated result of A×A and A×B is a value of t as it is. Accordingly, in the process by hardware in this case, the value stored in the arithmetic value memory Whmem is stored in both of the arithmetic value memories A'mem and Wlmem as it is and preparation for the next repetitive arithmetic operation is made. That is, when the value less than R of the X value (value obtained by the previous calculation) is 0, it is not necessary to calculate t. This means that it is not necessary to calculate the whole bit length of X in calculation of t.

For the case of (b), the calculation for obtaining nm is performed in the same manner as the first embodiment and the calculated result is stored in both of the arithmetic value memories A'mem and Wlmem in the form of A'mem-Wlmem. The value stored in the arithmetic value memory Wlmem is made to be the value of m. Calculation of t is continuously performed.

Calculation of t is as follows.

$$t = (X + m \times N)/R$$

$$= \text{Whmem} + \{\text{value above R of result of (Wlmem)} \times \text{(Nmem)}\} + (32)$$

The solution of the equation (32) is obtained by performing calculation of (Wlmem)×(Nmem) to store the calculated result in both of the arithmetic value memories A'mem and Wlmem in the form of A'mem-Wlmem and then performing calculation of the following equation.

$$(\text{A'mem}) \times 1 + (\text{Whmem}) + 1 \tag{33}$$

The reason is that since the value of X+m×N is a multiple of R necessarily, it is not necessary to calculate the value less than R purposely. In the equation (33), at the calculation timing of the least significant digit, 1 is supplied to the terminal +1 shown in FIG. 5 to execute addition of 1 in the equation (33).

The calculated result obtained in the equation (33) is stored in both of the arithmetic value memories A'mem and Wlmem and when overflow of digit occurs, 1 is written in the carry flag CF. The subsequent process is the same as that of the first embodiment.

As described above, according to the second embodiment, addition of the control circuit (which can be configured by the circuit scale corresponding to the bit length of the multiplier/adder and is a small-scale circuit) for detecting that the arithmetic value is 0 and controlling the sequence of the subsequent arithmetic operation can attain deletion of the arithmetic value memory Mmem of the coprocessor described in the first embodiment and deletion of an amount of arithmetic operation. Accordingly, deletion of hardware and reduction of the operation time can be attained.

Third Embodiment (Structure)

Figure 9:
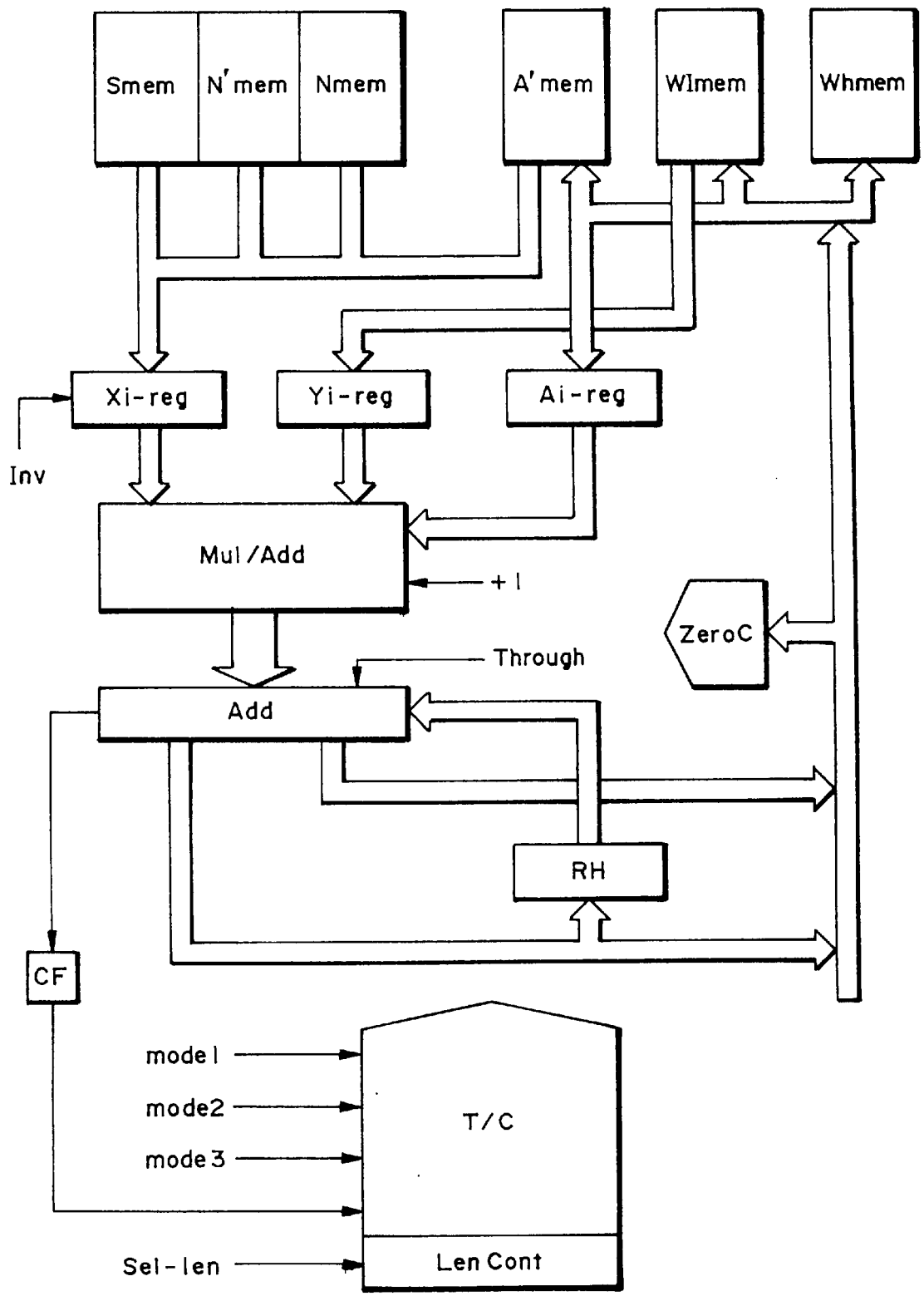
FIG. 9 is a block diagram schematically illustrating a third embodiment of the present invention.

FIG. 9 is a block diagram schematically illustrating a modular arithmetic coprocessor according to a third embodiment of the present invention.

The third embodiment includes, in addition to the configuration of the first embodiment (FIG. 5) or the second embodiment (FIG. 8), a bit length selection control circuit for selecting the bit length of the operand to change the timing/control signal.

More particularly, the bit length selection control circuit is represented by LenCont of FIG. 9. The bit length selection control circuit LenCont is operated to control the operation timing signal generated by the timing/control circuit T/C and the control signal supplied to the various circuits in the coprocessor in accordance with an input signal Sel-len.

(Operation)

In operation of the coprocessor, the value R, the value R' determined by the value of R, the bit length of the N' value and the repetitive procedure (the number of times) of the multiplication and addition of the prescribed bit length are changed in accordance with change of the bit length of the operand.

For example, when the high-speed multiplier/adder Mul/Add is of 16-bit length and performs multiplication of A×A having the operand bit length of 512 bits, the number of times for repetition of multiplication and addition by the high-speed multiplier/adder Mul/Add is as follows.

$$(512/16) \times (512/16) = 1024 \text{ times}$$

On the other hand, for the operand bit length of 768 bits, the number of times is as follows.

$$(768/16) \times (768/16) = 2304 \text{ times}$$

The sequences for these calculations are different. Further, as described above, since the value R is determined uniquely in accordance with the operand bit length, the bit lengths of the values R' and N' are changed correspondingly.

The bit length selection control circuit LenCon controls the factor for the above changes, that is, the circuit controls to produce the operation timing signal and the control signal generated by the timing/control circuit T/C in accordance with the selected bit length.

Generally, the bit length selection control circuit LenCont can be realized by a relatively small-scale circuit configuration such as PLA or logic circuits.

As described above, in the coprocessor of the third embodiment, the bit length selection control circuit LenCont is added to thereby be able to execute the modular arithmetic or the modulo exponentiation arithmetic having various operand bit lengths.

Fourth Embodiment (Structure)

The foundation of the arithmetic operation of the coprocessor described in the above embodiments is the multiplication and the addition of the prescribed bit length. The method of repeating the basic multiplication and addition to realize the modular arithmetic or the modulo exponentiation arithmetic is as described in the above embodiments.

In the above embodiments, however, since the coprocessor peiforms only the modular arithmetic mode, application thereof is limited to the modular arithmetic although the basis of the arithmetic operation is multiplication and addition.

Accordingly, the multiplication and addition mode of a long bit length which is the foundation of various arithmetic operations is added to improve the generality of the coprocessor.

Figure 10:
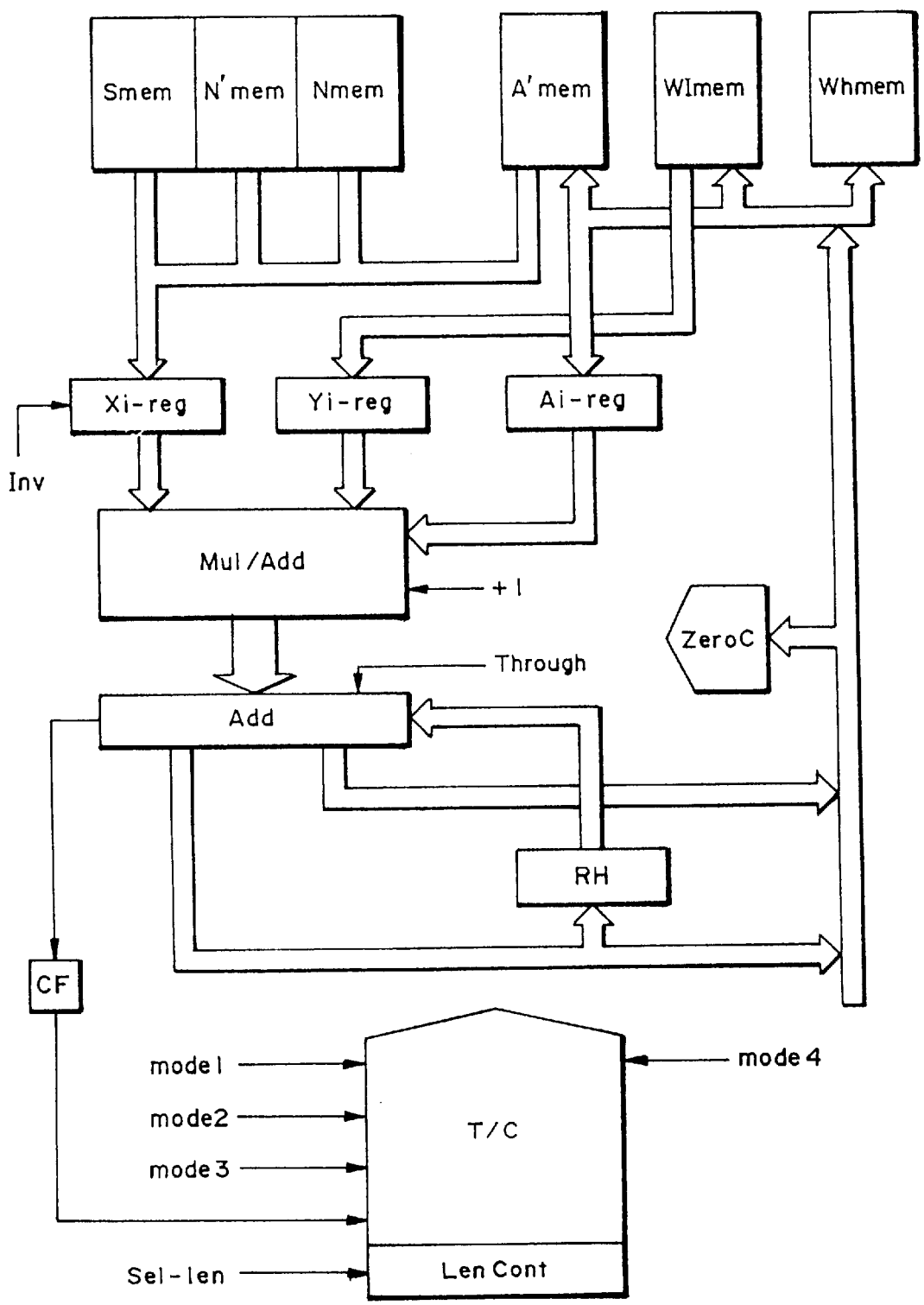
FIG. 10 is a block diagram schematically illustrating a fourth embodiment of the present invention.

FIG. 10 is a block diagram schematically illustrating the modular arithmetic coprocessor according to a fourth embodiment of the present invention.

In the fourth embodiment, the multiplication and addition mode is added to the embodiments described above. In order to execute this mode, a mode signal 4 is supplied to the timing/control circuit T/C.

(Operation)

An execution example of the multiplication and addition shown below is now described.

$$A \times B + C \tag{34}$$

First of all, in the equation (34), values A, B and C are stored in the arithmetic value memories Wlmem, Smem and Whmem. The mode signal 4 is supplied to the timing/control circuit T/C to set the kind of arithmetic operation to the mode of executing multiplication and addition.

The above operation is expressed in detail by hardware image as shown in FIG. 11.

This arithmetic operation means that values obtained by adding values stored in addresses Wh3, Wh2, Wh1 and Wh0 to values obtained by multiplying values stored in addresses S3, S2, S1 and S0 of the arithmetic value memory Smem by values stored in addresses Wl3, Wl2, Wl1 and Wl0 of the arithmetic value memory Wlmem are stored in addresses Wh3, Wh2, Wh1, Wh0, Wl3, Wl2, Wl1 and Wl0 of the arithmetic value memories Whmem and Wlmem.

(Unit of Multiplication and Addition 1) First, the value (multiplicand) stored in address Wl0 of the arithmetic value memory Wlmem is supplied to the register Yi-reg, the value (multiplier) stored in address S0 of the arithmetic value memory Smem is supplied to the register Xi-reg, and the value (addend) stored in address Wh0 of the arithmetic value memory Whmem is supplied to the register Ai-reg. Then, the high-speed multiplier/adder Mul/Add multiplies the multiplier by the multiplicand and adds the multiplied result to the addend to supply the added result to the high-speed adder Add. In this multiplication and addition unit 1, a high level signal is supplied to the through terminal of the high-speed adder Add so that contents of the register RH is not added.

Since the lower digit of the operation result in the unit of multiplication and addition is the least significant digit of the final operation result of this multiplication and addition, the lower digit of the operation result in the unit of multiplication and addition 1 is stored in the least significant address Wl0 of the arithmetic value memory Wlmem as the final operation result of this multiplication. (In FIG. 11, the final operation result is stored in the underlined address.) The upper digit of the operation result of the unit of multiplication and addition 1 is stored in the register RH for the next unit of multiplication and addition.

(Unit of Multiplication and Addition 2)

The register Yi-reg holds the already stored value (multiplicand) and the register Xi-reg takes in the value (multiplier) stored in the address S1 of the arithmetic value memory Smem and the register Ai-reg takes in the value (addend) stored in address Wh1 of the arithmetic value memory Whmem. Then, the high-speed multiplier/adder Mul/Add multiplies the multiplier by the multiplicand and adds the multiplied result to the addend to supply the added result to the high-speed adder Add. In this multiplication and addition unit 2, a low level signal is supplied to the through terminal of the high-speed adder Add so that contents (the upper digit of the operation result of the multiplication and addition unit 1) of the register RH is added to the output of the high-speed multiplier/adder Mul/Add. The lower digit of the operation result in the unit of multiplication and addition 2 is stored in the least significant address Wh0 of the arithmetic value memory Whmem. The upper digit of the operation result of the unit of multiplication and addition 2 is stored in the register RH in order to align the digit in the next unit of multiplication and addition.

(Unit of Multiplication and Addition 3)

The register Yi-reg holds the already stored value (multiplicand) and the register Xi-reg takes in the value (multiplier) stored in the address S2 of the arithmetic value memory Smem and the register Ai-reg takes in the value (addend) stored in address Wh2 of the arithmetic value memory Whmem. Then, the high-speed multiplier/adder Mul/Add multiplies the multiplier by the multiplicand and adds the multiplied result to the addend to supply the added result to the high-speed adder Add. In this multiplication and addition unit 3, a low level signal is supplied to the through terminal of the high-speed adder Add so that contents (the upper digit of the operation result of the multiplication and addition unit 2) of the register RH is added to the output of the high-speed multiplier/adder Mul/Add. The lower digit of the operation result in the unit of multiplication and addition 3 is stored in the least significant address Wh1 of the arithmetic value memory Whmem. The upper digit of the operation result of the unit of multiplication and addition 3 is stored in the register RH in order to align the digit in the next unit of multiplication and addition.

(Unit of Multiplication and Addition 4)

The register Yi-reg holds the already stored value (multiplicand) and the register Xi-reg takes in the value (multiplier) stored in the address S3 of the arithmetic value memory Smem and the register Ai-reg takes in the value (addend) stored in address Wh3 of the arithmetic value memory Whmem. Then, the high-speed multiplier/adder Mul/Add multiplies the multiplier by the multiplicand and adds the multiplied result to the addend to supply the added result to the high-speed adder Add. In this multiplication and addition unit 4, a low level signal is supplied to the through terminal of the high-speed adder Add so that contents (the upper digit of the operation result of the multiplication and addition unit 3) of the register RH is added to the output of the high-speed multiplier/adder Mul/Add. The lower digit of the operation result in the unit of multiplication and addition 4 is stored in the least significant address Wh2 of the arithmetic value memory Whmem. The upper digit of the operation result of the unit of multiplication and addition 4 is stored in address wh3 of the arithmetic value memory Whmem in order to align the digit in the next unit of multiplication and addition.

(Unit of Multiplication and Addition 5)

The value (multiplicand) stored in address Wl1 of the arithmetic value memory Wlmem is supplied to the register Yi-reg, the value (multiplier) stored in address S0 of the arithmetic value memory Smem is supplied to the register Xi-reg, and the value (addend) stored in address Wh0 of the arithmetic value memory Whmem is supplied to the register Ai-reg. Then, the high-speed multiplier/adder Mul/Add multiplies the multiplier by the multiplicand and adds the multiplied result to the addend to supply the added result to the high-speed adder Add. In this multiplication and addition unit 5, a high level signal is supplied to the through terminal of the high-speed adder Add so that contents (upper digit of the operation result of the multiplication and addition unit 4) of the register RH is not added. The least significant digit of the operation result of the multiplication and addition unit 5 is stored in address Wl1 of the arithmetic value memory Wlmem. The most significant digit of the operation result of the multiplication and addition unit 5 is stored in the register RH in order to align the digit in the next unit of multiplication and addition.

(Unit of Multiplication and Addition 6)

The register Yi-reg holds the already stored value (multiplicand) and the register Xi-reg takes in the value (multiplier) stored in the address S1 of the arithmetic value memory Smem and the register Ai-reg takes in the value (addend) stored in address Wh1 of the arithmetic value memory Whmem. Then, the high-speed multiplier/adder Mul/Add multiplies the multiplier by the multiplicand and adds the multiplied result to the addend to supply the added result to the high-speed adder Add. In this multiplication and addition unit 6, a low level signal is supplied to the through terminal of the high-speed adder Add so that contents (the upper digit of the operation result of the multiplication and addition unit 5) of the register RH is added to the output of the high-speed multiplier/adder Mul/Add. The lower digit of the operation result in the unit of multiplication and addition 6 is stored in address Wh0 of the arithmetic value memory Whmem. The upper digit of the operation result of the unit of multiplication and addition 6 is stored in the register RH in order to align the digit in the next unit of multiplication and addition.

(Unit of Multiplication and Addition 7)

The register Yi-reg holds the already stored value (multiplicand) and the register Xi-reg takes in the value (multiplier) stored in the address S2 of the arithmetic value memory Smem and the register Ai-reg takes in the value (addend) stored in address Wh2 of the arithmetic value memory Whmem. Then, the high-speed multiplier/adder Mul/Add multiplies the multiplier by the multiplicand and adds the multiplied result to the addend to supply the added result to the high-speed adder Add. In this multiplication and addition unit 7, a low level signal is supplied to the through terminal of the high-speed adder Add so that contents (the upper digit of the operation result of the multiplication and addition unit 6) of the register RH is added to the output of the high-speed multiplier/adder Mul/Add. The lower digit of the operation result in the unit of multiplication and addition 7 is stored in address Wh1 of the arithmetic value memory Whmem. The upper digit of the operation result of the unit of multiplication and addition 7 is stored in the register RH in order to align the digit in the next unit of multiplication and addition.

(Unit of Multiplication and Addition 8)

The register Yi-reg holds the already stored value (multiplicand) and the register Xi-reg takes in the value (multiplier) stored in the address S3 of the arithmetic value memory Smem and the register Ai-reg takes in the value (addend) stored in address Wh3 of the arithmetic value memory Whmem. Then, the high-speed multiplier/adder Mul/Add multiplies the multiplier by the multiplicand and adds the multiplied result to the addend to supply the added result to the high-speed adder Add. In this multiplication and addition unit 8, a low level signal is supplied to the through terminal of the high-speed adder Add so that contents (the upper digit of the operation result of the multiplication and addition unit 7) of the register RH is added to the output of the high-speed multiplier/adder Mul/Add. The lower digit of the operation result in the unit of multiplication and addition 8 is stored in address Wh2 of the arithmetic value memory Whmem. The upper digit of the operation result of the unit of multiplication and addition 8 is stored in the address Wh3 of the arithmetic value memory Whmem.

The units of multiplication and addition 9 to 16 are performed in accordance with the above multiplication and addition unit as shown in FIG. 11. Thus, the final operation result is stored in the form of Whmem-Wlmem ("-" is not a mark representing subtraction).

FIG. 12 shows the unit of multiplication and addition in case where 8591×4673+2069=40147812 is performed by the above hardware. Operation of FIG. 12 is the same as FIG. 11 and accordingly description thereof is omitted.

As described above, according to the fourth embodiment, since the multiplication and addition mode having the long bit length which is the foundation of various arithmetic operations can be realized, the generality of the coprocessor can be improved greatly.

(Calculation of N')

In addition, for the multiplication and addition, the calculation of N' will be described, hereinafter. As described hereinbefore, each of the values is as follows:

(1) R×R'−N×N'=1 (R×RmodN=1)
(2) R is defined as an exponent of 2 which is slightly larger than modulus N
(3) N is odd
(4) 0<N'<R Then,

R×R'=XXX . . . XXX000 . . . 000

N×N'=YYY . . . YYY111 . . . 111        (35)

(the number of "0", "1" is n)

XXX . . . XXX=YYY . . . YYY+1=R'        (36)

In order to obtain N' based on N, it is necessary to give the above equation (35) in such a manner that all of the lower bits of N×N' are equal to "1".

Figure 21:
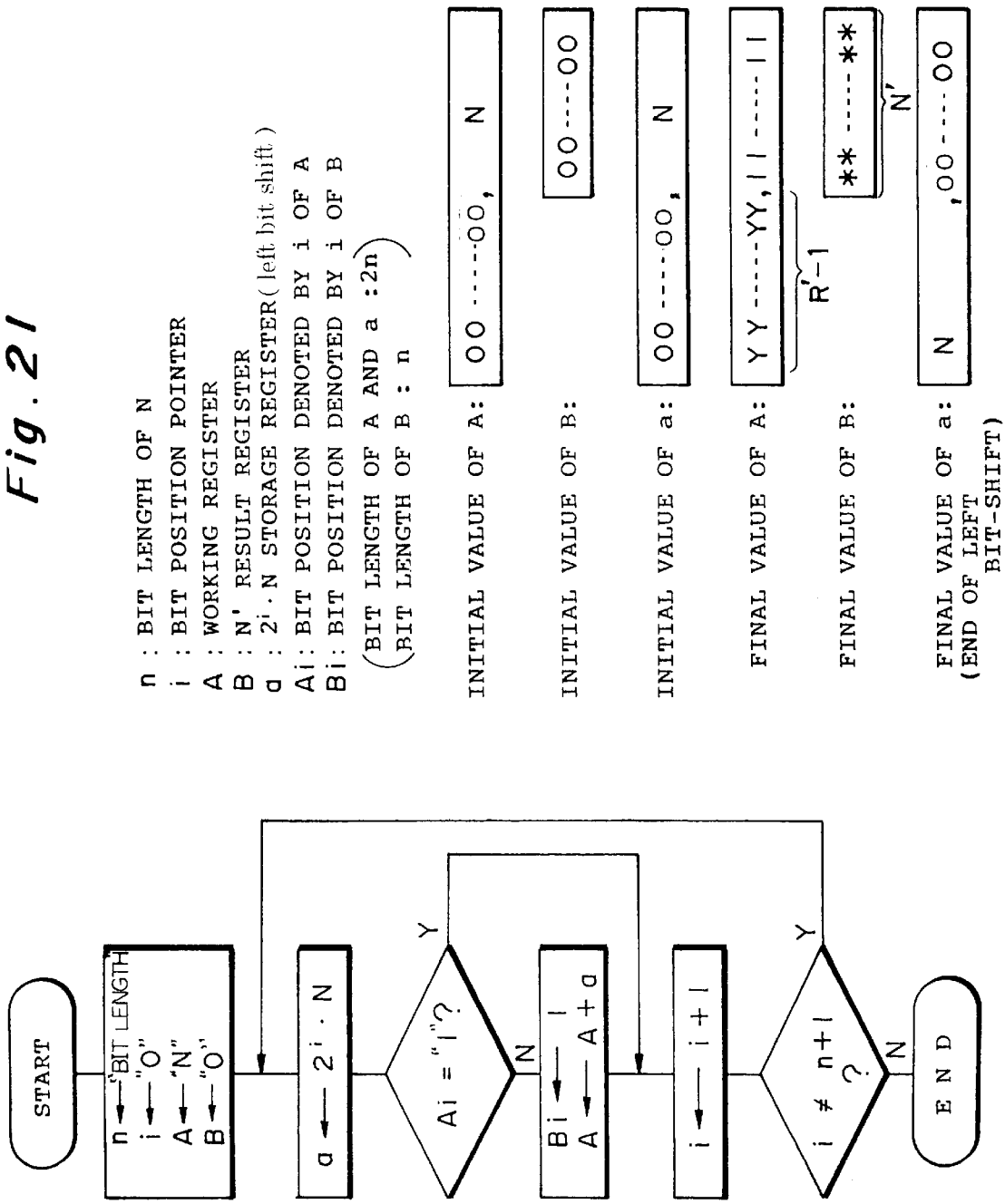
FIG. 21 is a flowchart showing the calculation of N'.

FIG. 21 is a flowchart showing the calculation of N'. In FIG. 21, the reference symbol n denotes the bit length of N, i the bit position pointer, A the working register, B the N' result register, a $2^iN$ storage register, Ai the bit position denoted by i of A, and Bi the bit position denoted by i of B, wherein the bit length of the working register A and the $2^iN$ a is 2n, and the bit length of B is n.

Firstly, data representing the bit length of N is set to n and the value of N is set to the working register A, while the bit position pointer i and the N' result register B are clear. Next, the $2^iN$ storage register is set $2^iN$ (initial value is $2^0N$). Further, the value of the bit position Ai is checked on whether it is equal to 1 or not. If yes, then the bit position pointer i develops its increment. If no, then the bit position Bi is set 1 and a new value of the former value of the working register A plus the value (initial value is $2^0N$) of the $2^iN$ storage register is set to the working register A; and also the same increment of the bit position pointer i follows. Moreover, the bit position pointer i is checked on whether or not it is equal to the bit length of N plus 1. If yes(it differs therefrom), then the similar procedure continues, which will repeat until it reaches the bit length of N plus 1. If no (it equals thereto), the calculation of N' is over. In this way, the final value of the N' result register B provides N'.

Hereinbelow, an example of calculating N' and R' will be described. FIG. 22 shows an example of calculating N' and R', each of which involves comparatively short digit number.

Firstly, for a given N (=11010111), the left bit-shift of N is repeated until the LSB (Least Significant Bit) of the shifted N encounters a first "0" bit ($2^3$) lying in the $2^0$×N, that is, the left bit-shift is performed three times. This gives $2^3$×N. Next, the $2^0$×N and $2^3$N are added, which provides a first sum 11110001111 as shown in the figure. Similarly to the way of obtaining the $2^3$×N, for this sum, the left bit-shift of N is repeated until the LSB of the shifted N encounters a first "0" bit ($2^4$) lying in the sum, namely, the left bit-shift is executed four times, thereby giving $2^4$×N. Subsequently, the sum and $2^4$×N are added, thus producing a second sum (=10100111111111). Finally, adding $2^0$×N, $2^3$×N, and $2^4$×N, which is a total sum of $2^i$, gives N' (=25). Incidentally, the digit number of the R(=100000000) is 9. Since the figures (=10100) lying in digit positions equal to or more than the 9th digit position provides R'−1, thereby giving R' (=21).

Fifth Embodiment (Structure)

Since the coprocessor described in the above embodiments is required to make access to the memory for each unit of multiplication and addition determined by the input bit length of the high-speed multiplier/adder Mul/Add and the high-speed adder Add, there is room for improvement in reduction of the operation time. The reason is that the operation speed of the whole circuit including the memories is limited by the memory access time.

In this embodiment, the number of times of accesses to the memories with respect to the number of times of arithmetic operations in the unit of multiplication and addition is reduced to shorten the final operation time.

Figure 13:
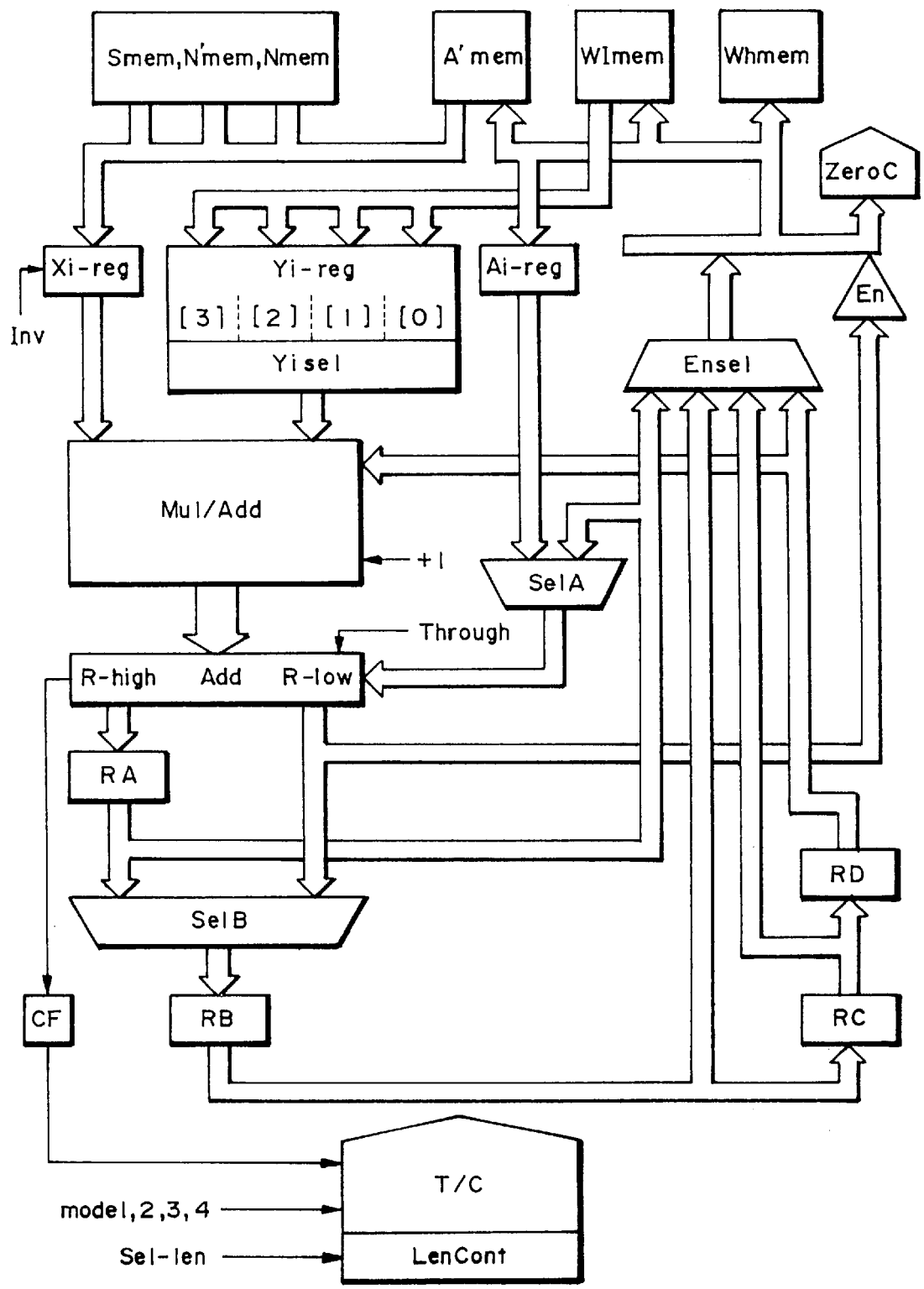
FIG. 13 is a block diagram schematically illustrating a fifth embodiment of the present invention.

FIG. 13 is a block diagram schematically illustrating the modular arithmetic coprocessor according to the fifth embodiment of the present invention.

In the fifth embodiment, the multiplicand storage register Yi-reg is increased to a plurality of multiplicand storage registers and there is provided a circuit for selecting outputs of the plurality of multiplicand storage registers as compared with the above embodiments. Further, the registers for storing the upper digit output value or the lower digit output value of the high-speed adder Add are provided correspondingly in number to the multiplicand storage registers and there are provided selection circuits for properly selecting output values of the registers.

More particularly, registers Yi-reg[0], Yi-reg[1], Yi-reg[2] and Yi-reg[3] are the multiplicand storage registers having the bit length corresponding to the input bit length of the high-speed multiplier/adder Mul/Add and respective outputs of these multiplicand storage registers are connected to the multiplicand selection circuit Yi-sel. The multiplicand selection circuit Yi-sel is a selection circuit which selects any one of values in the registers Yi-reg[0], Yi-reg[1], Yi-reg[2] and Yi-reg[3] to supply the selected value to the high-speed multiplier/adder Mul/Add in the subsequent state.

A register RA is a register for temporauly storing the upper digit R-high of the output of the high-speed adder Add and the output of the register RA is connected to the selection circuits SelA, SelB and EnSel. The lower digit R-low of the output of the high-speed adder Add is connected to the selection circuit SelB and an enable buffer En.

The output of the register Ai-reg is connected to the selection circuit SelA. The selection circuit SelA selects any of contents of the register Ai-reg and the register RA and is connected to the high-speed adder Add to supply the selected signal to the high-speed adder Add.

The selection circuit SelB selects any of contents of R-low and a register RA and is connected to the register RB to supply the selected result to the register RB.

The register RB is a register for temporarily storing the output of the selection circuit SelB and the output of a register RB is connected to the register RC and Ensel.

The register RC is a register for temporarily storing the output of the register RB and the output of the register RC is connected to a register RD and the selection circuit Ensel.

The register RD is a register for temporauly storing the output of the register RC and the output of the register RD is connected to the selection circuit Ensel and the high-speed multiplier/adder Mul/Add.

The selection circuit Ensel is a selection circuit for selecting any one of contents of the registers RA, RB, RC and RD and supplying the selected result to the arithmetic value memories.

Other circuits have the same function as that of the above embodiments and accordingly description thereof is omitted.

(Operation)

The calculation method of the following equation:

(A3A2A1A0)×B0+C0 which is the foundation of the arithmetic is now described with reference to FIG. 14 using the following hardware image.

(Wl3, Wl2, Wl1, Wl0)×S0=(RA, RB, RC, RD, Wl0)

The underlined address means that the final arithmetic result is stored therein.

(Initialization)

First, as shown in FIG. 14, the initialization is performed.

(Step 1)

An arithmetic operation is made among a value of the register Xi-reg, a value of the register Yi-reg[0] selected by the selection circuit Yi-sel, a value of the register RD and a value of the register Ai-reg selected by the selection circuit SeIA. Immediately before the end of this arithmetic operation, the upper digit R-high of the arithmetic result is stored in the register RA and the lower digit R-low thereof is stored in the arithmetic value memory Wlmem. At the same time, the values of the registers RC and RB are stored in the registers RD and RC, respectively, and the value of the register RA is stored in the register RB selected by the selection circuit SelB.

(Step 2)

The arithmetic operation is made among the value of the register Xi-reg, the value of the register Yi-reg[1] selected by the selection circuit Yi-sel, the value of the register RD and the value of the register RA selected by the selection circuit SelA. Immediately before the end of this arithmetic operation, the upper digit R-high of the arithmetic result is stored in the register RA and the lower digit R-low thereof is stored in the register RB selected by the selection circuit SelB. At the same time, the values of the registers RC and RB are stored in the registers RD and RC, respectively.

(Step 3)

The arithmetic operation is made among the value of the register Xi-reg, the value of the register Yi-reg[2] selected by the selection circuit Yi-sel, the value of the register RD and the value of the register RA selected by the selection circuit SelA. Immediately before the end of this arithmetic operation, the upper digit R-high of the arithmetic result is stored in the register RA and the lower digit R-low thereof is stored in the register RB selected by the selection circuit SelB. At the same time, the values of the registers RC and RB are stored in the registers RD and RC, respectively.

(Step 4)

The arithmetic operation is made among the value of the register Xi-reg, the value of the register Yi-reg[3] selected by the selection circuit Yi-sel, the value of the register RD and the value of the register RA selected by the selection circuit SelA. Immediately before the end of this arithmetic operation, the upper digit R-high of the arithmetic result is stored in the register RA and the lower digit R-low thereof is stored in the register RB selected by the selection circuit SelB. At the same time, the values of the registers RC and RB are stored in the registers RD and RC, respectively.

In the above process from step 1 to step 4, the access to the arithmetic value memory is merely made once in step 1. Accordingly, during the remaining period from step 2 to step 4, change of addresses of the arithmetic value memories and precharging can be made to obtain the time for access to the memory. The operations performed in the period from step 2 to step 4 are substantially identical and accordingly the arithmetic operation is not complicated.

As another example of the arithmetic operation, the calculation method of the following equation:

(A3, A2, A1, A0)×(B3, B2, B1, B0)+(C3, C2, C1, C0)

is shown in FIGS. 15 and 16 using the following hardware image.

(Wl3, Wl2, Wl1, Wl0)×(S3, S2, S1, S0)+(Wh3, Wh2, Wh1, Wh0)=(RA, RB, RC, RD, Wl3, Wl2, Wl1, Wl0)

Further, as an example of an actual calculation, FIG. 16 shows the arithmetic process from time 1 to time 4 of 8591×4673+2069=40147812.

The underlined values are the final results of the arithmetic operation.

It can be understood from FIG. 16 that the upper digits of the final result are values stored in the registers RA, RB, RC and RD obtained in step 4 of time 4 and the lower digits are values stored in the arithmetic value memory Wlmem obtained in step 1.

As described above, according to the fifth embodiment, it is not necessary to change the size of the arithmetic processing unit such as the multiplier/adder and the like, and there can be realized the modular arithmetic coprocessor constituted by a small-scale circuit as a whole and having a short operation time.

Sixth Embodiment (Structure)

Figure 17:
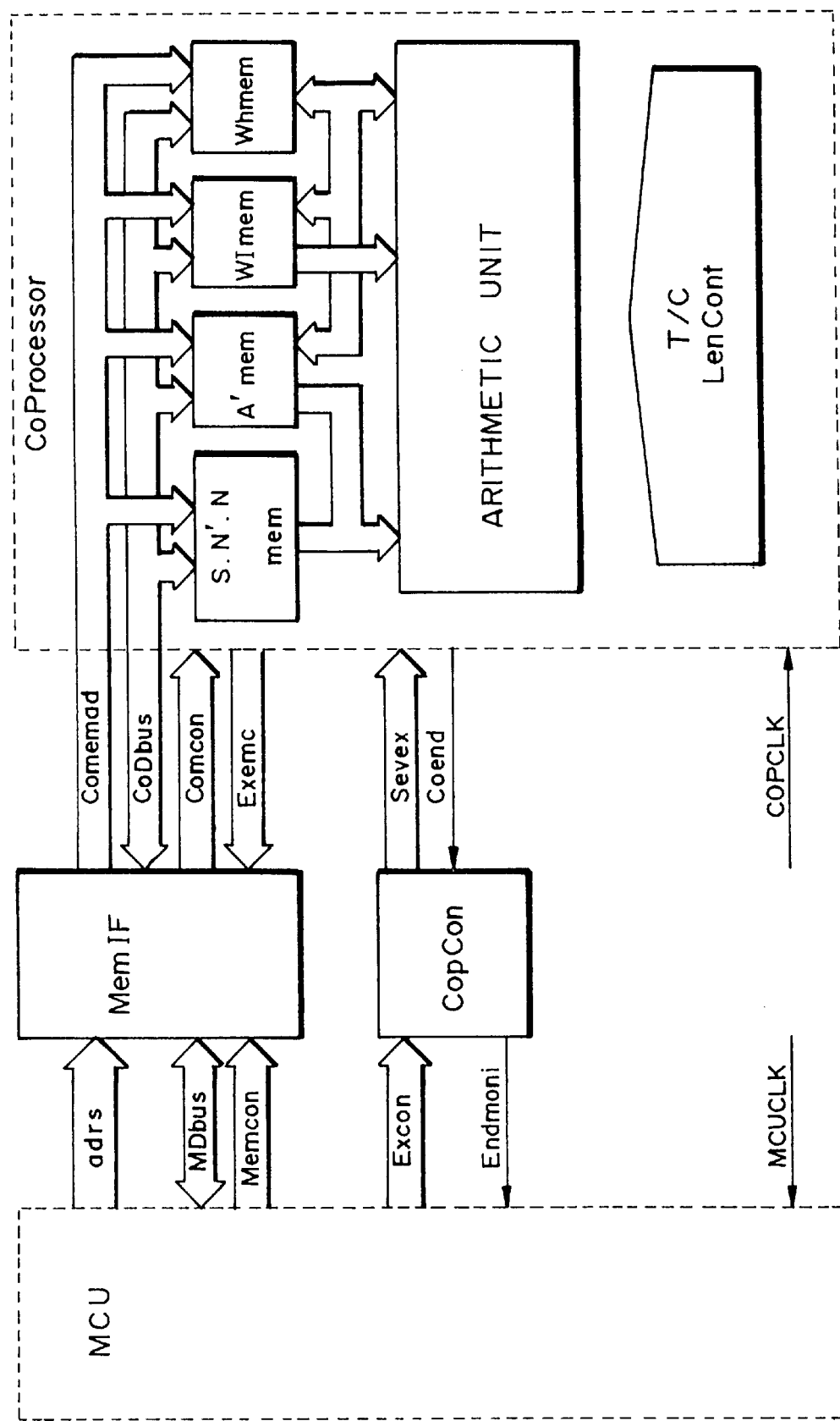
FIG. 17 is a block diagram schematically illustrating a sixth embodiment of the present invention.

FIG. 17 is a block diagram schematically illustrating the sixth embodiment of the present invention. The embodiment includes an arithmetic value memory interface circuit and an arithmetic control circuit provided between the coprocessor described above and the external unit.

(Arithmetic Value Memory Interface Circuit MemIF)

The circuit MemIF serves to transmit and receive data between MCU and the arithmetic value memories in the coprocessor.

The arithmetic value memories store arithmetic data from the outside of the coprocessor prior to the arithmetic operation and send the arithmetic results to the outside of the coprocessor upon completion of the arithmetic operation. At the same time, the arithmetic value memories repeatedly make access to the arithmetic unit dynamically without relation to the outside of the coprocessor. That is, the arithmetic value memories have two kinds of communication protocol. The arithmetic value memory interface circuit is constituted to attain the protocol.

An address signal adrs and a memory control signal Memcon produced by the MCU are inputted to the arithmetic value memory interface MemIF and an address signal Comemad and a memory control signal Comcon are prepared for each arithmetic value memory in the coprocessor in the arithmetic value memory interface MemIF to be supplied to the coprocessor. MDbus is a data bus of MCU and CoDbus is a data bus for external interface of the coprocessor.

When the arithmetic value memories are disposed in a single memory space within the MCU, one kind of the adrs signal and the Memcon signal inputted to the arithmetic value memory interface MemIF, and MDbus are provided, while when the arithmetic value memories are disposed in a plurality of memory spaces, a plurality of kinds of inputs are required. Generally, MDbus and CoDbu are often connected directly, while, for example, when the data length of the arithmetic value memories processed within the coprocessor and the data length of MCU are different, data conversion is made through the arithmetic value memory interface MemIF.

Further, since the arithmetic value memories are operated dynamically for execution of the arithmetic while the coprocessor executes the arithmetic, it is controlled to inhibit access from the MCU. In this manner, the first communication protocol between the arithmetic value memories in the coprocessor and the external unit is realized.

Upon execution of the arithmetic, a memory control signal produced by the timing/control circuit T/C in the coprocessor is inputted to the arithmetic value memory interface MemIF. When the arithmetic value memory interface MemIF receives the signal, the interface MemIf supplies to the coprocessor the Comemad signal and the Comcon signal processed to cause the arithmetic value memories to transmit and receive data between the arithmetic unit and the arithmetic value memories. In this manner, the second communication protocol between the arithmetic unit and the arithmetic value memories during execution of the arithmetic within the coprocessor is realized.

(Arithmetic Control Circuit CopCon)

The arithmetic control circuit CopCon serves to receive a coprocessor control signal Excon produced by the MCU and supply an arithmetic control signal Sevex (arithmetic mode signal, bit length selection signal and the like in the above embodiments) to the coprocessor. The arithmetic operation in the coprocessor is started by supplying the arithmetic mode signal and the clock COPCLK for the coprocessor.

Further, in order to confirm the completion of the arithmetic operation on the side of the MCU, a timing signal Coend for completion of the arithmetic produced by the timing/control circuit T/C in the coprocessor is received by CopCon and an arithmetic completion monitoring signal Endmoni processed by a latch circuit or the like is supplied to MCU.

Generally, the arithmetic control circuit CopCon can be constituted to be distributed in a local memory area as a peripheral circuit of MCU and make direct access by an instruction of MCU and can be realized by a relatively simple circuit.

In FIG. 17, an MCUCLK signal represents a clock for MCU and a COPCLK signal represents a clock for the coprocessor.

As described above, according to the sixth embodiment, since the interface between the external unit (for example, MCU) and the coprocessor can be realized by a relatively small-scale circuit, the modular arithmetic coprocessor with the external interface or the MCU including the modular arithmetic coprocessor can be constituted and can be realized by LSI.

Seventh Embodiment

The measure for confirming the completion of the arithmetic from the outside of the coprocessor is only the examination of the arithmetic completion monitoring signal Endmoni. However, in this method, since an amount of modular arithmetic operation having the long bit length processed by the coprocessor is increased, the time for always monitoring the Endmoni oln the side of the MCU in case where the external unit is, for example, the MCU is made relatively long and accordingly the operation performance of the MCU is reduced.

In order to solve this problem, this embodiment includes an exclusive interrupt control circuit for the completion time of the arithmetic.

Figure 18:
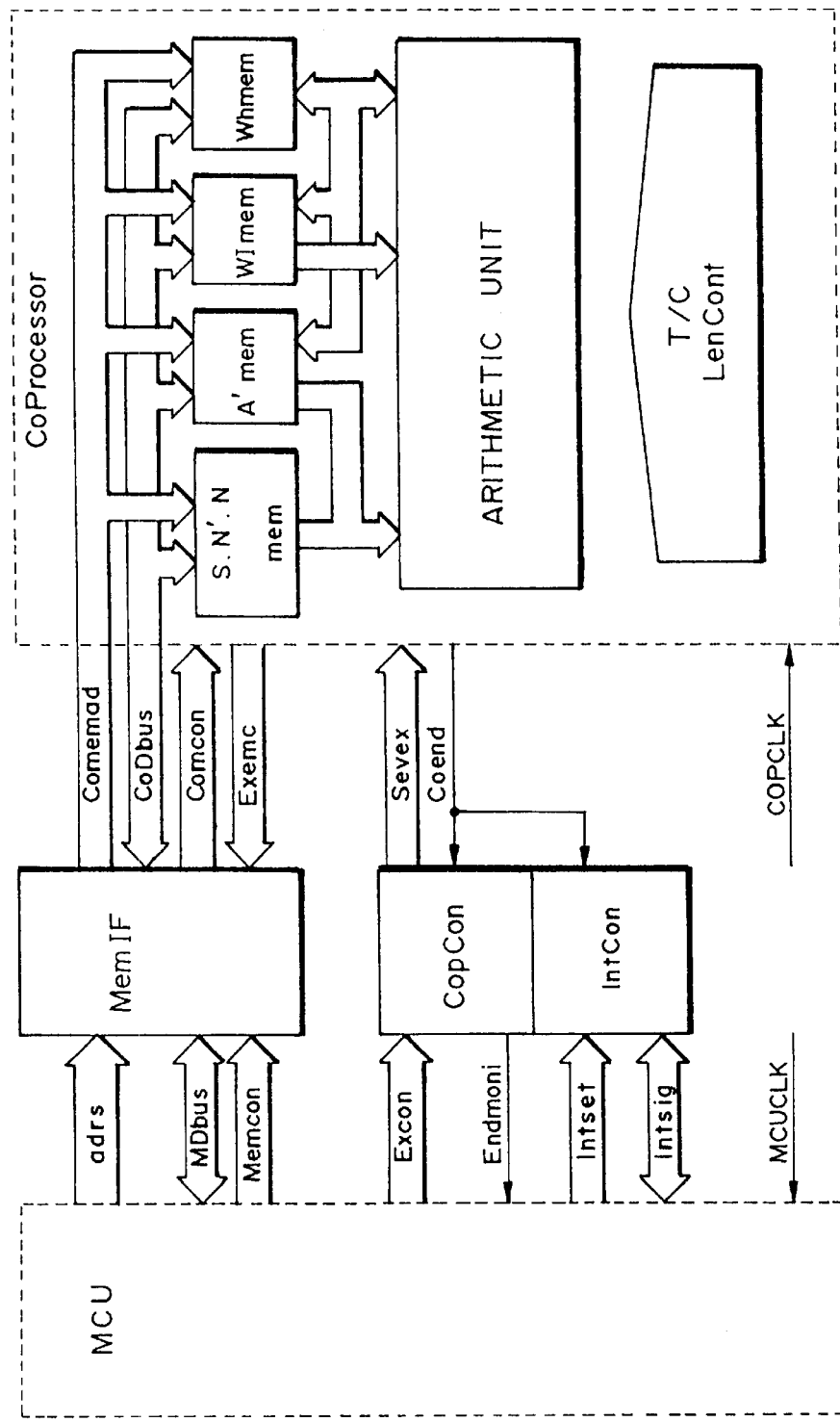
FIG. 18 is a block diagram schematically illustrating a seventh embodiment of the present invention.

FIG. 18 is a block diagram schematically illustrating the seventh embodiment of the present invention.

In FIG. 18, IntCon represents an arithmetic completion interrupt control circuit in which preparation of the interrupt is made by an interrupt setting signal Intset produced by the MCU previously. When the arithmetic completion timing signal Coend is inputted by the coprocessor, an interrupt processing request signal, an acknowledge signal and a vector control signal necessary for the interrupt are transmitted and received as Intsig between the MCU and the IntCon for each kind of the arithmetic mode set by the CopCon and finally the interrupt preparation is canceled to terminate the interrupt process.

A single interrupt factor for the arithmetic completion may be set fixedly, while since the coprocessor has a plurality of arithmetic modes, the method of development to the modulo exponentiation arithmetic by the external unit is made easy by performing interrupt for each arithmetic mode and accordingly it is desirable to set a plurality of interrupt factors.

Intcon can be constituted to be distributed in a local memory area as a peripheral circuit of the MCU similarly to the arithmetic control circuit CopCon and make direct access by an instruction of MCU and can be realized by a relatively simple circuit.

As described above, according to the seventh embodiment, the modular arithmetic coprocessor with the external interface or the MCU including the modular arithmetic coprocessor having the arithmetic completion interrupt function can be constituted by a relatively small-scale circuit and can be realized by LSI.

Eighth Embodiment

Since the modular arithmetic operation in the coprocessor is dynamically performed from the beginning to the end of the arithmetic operation, it is convenient that operation of the external unit during execution of the arithmetic may be set to a temporary stop state (hereinafter referred to sleep) in order to suppress a consumption current during execution of the arithmetic in the whole system connected to the external unit.

The embodiment includes an exclusive external unit sleep control circuit and clock control circuit provided in order to realize the sleep operation.

Figure 19:
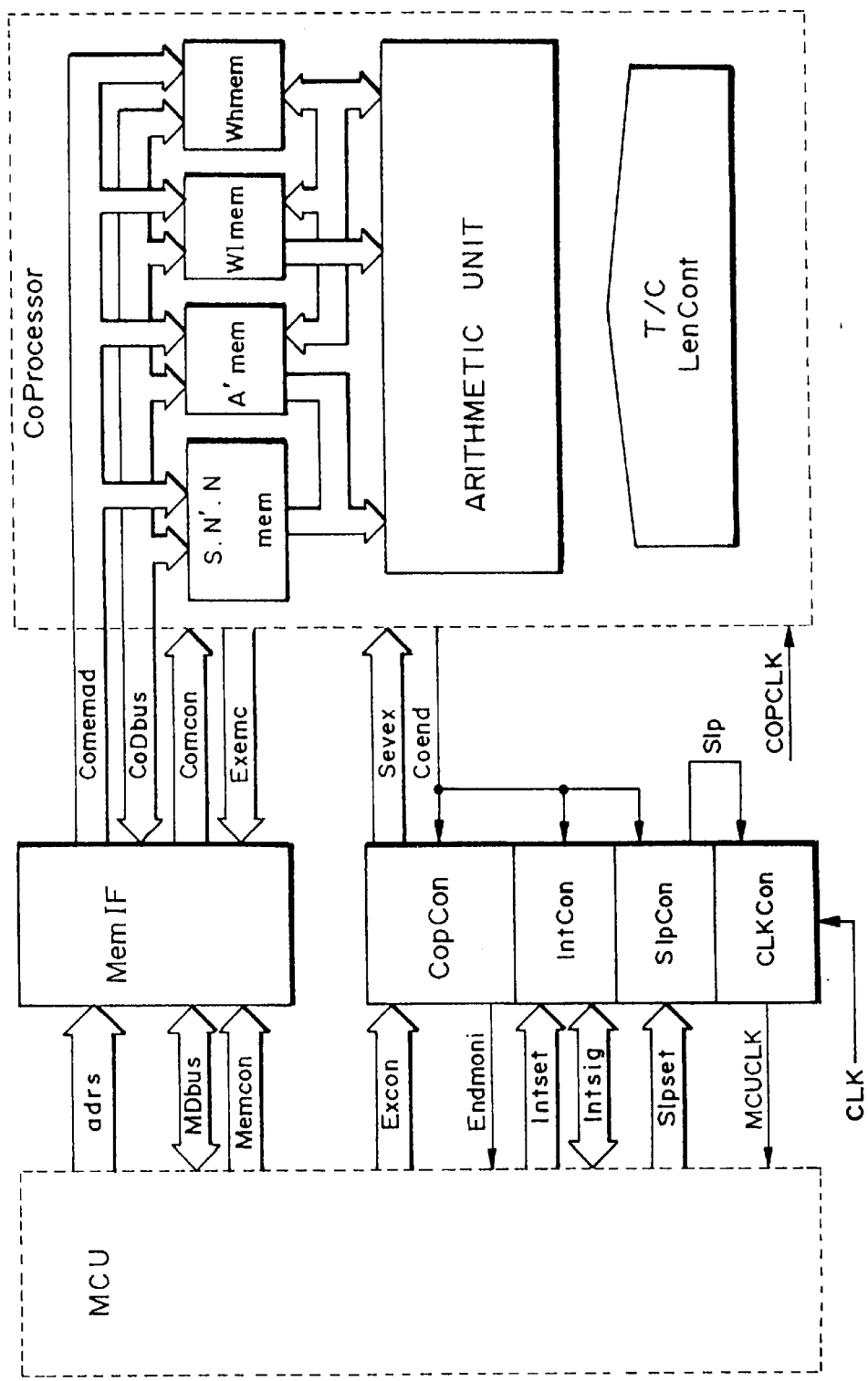
FIG. 19 is a block diagram schematically illustrating an eighth embodiment of the present invention.

FIG. 19 schematically illustrates the eighth embodiment and includes the external unit sleep control circuit and the clock control circuit added to the seventh embodiment.

In FIG. 19, Slpcon represents an MCU sleep control circuit, which receives a sleep set signal Slpset from the MCU and produces a sleep signal Slp to supply the sleep signal to the clock control circuit CLKCon.

The clock control circuit CLKCon usually supplies the clock MCUCLK to the MCU in response to the system clock CLK signal inputted externally, while once the Slp signal is received, the clock control circuit CLKCon serves to stop supply of the clock MCUCLK to the MCU.

Upon completion of the arithmetic operation, the arithmetic completion timing signal Coend is supplied to the SlpCon to stop supply of the Slp signal to the CLKCon, so that supply of MCUCLK to the MCU from the CLKCon is resumed.

Generally, the sleep function is often canceled by inputting a signal to a certain terminal of the external unit. Accordingly, in this case, the sleep control circuit SlpCon may be constituted to have this function.

The SlpCon can be constituted to be distributed in a local area memory as a peripheral circuit of the MCU similarly to the arithmetic control circuit CopCon and to make direct access by an instruction of the MCU and can be realized by a relatively simple circuit.

As described above, according to the eighth embodiment, the modular arithmetic coprocessor with the external interface or the MCU including the modular arithmetic coprocessor having the external unit sleep function can be constituted by a relatively small-scale circuit and can be realized by LSI.

Ninth Embodiment

The coprocessor can be used when the high-speed characteristic of the processing time of the cryptograph algorithm for performing a large-scale complicated modular arithmetic is questioned. Accordingly, it is required that the operation time is short even for any frequency of an input clock supplied to the system.

A frequency multiplied clock control circuit is included to improve the operation speed.

Figure 20:
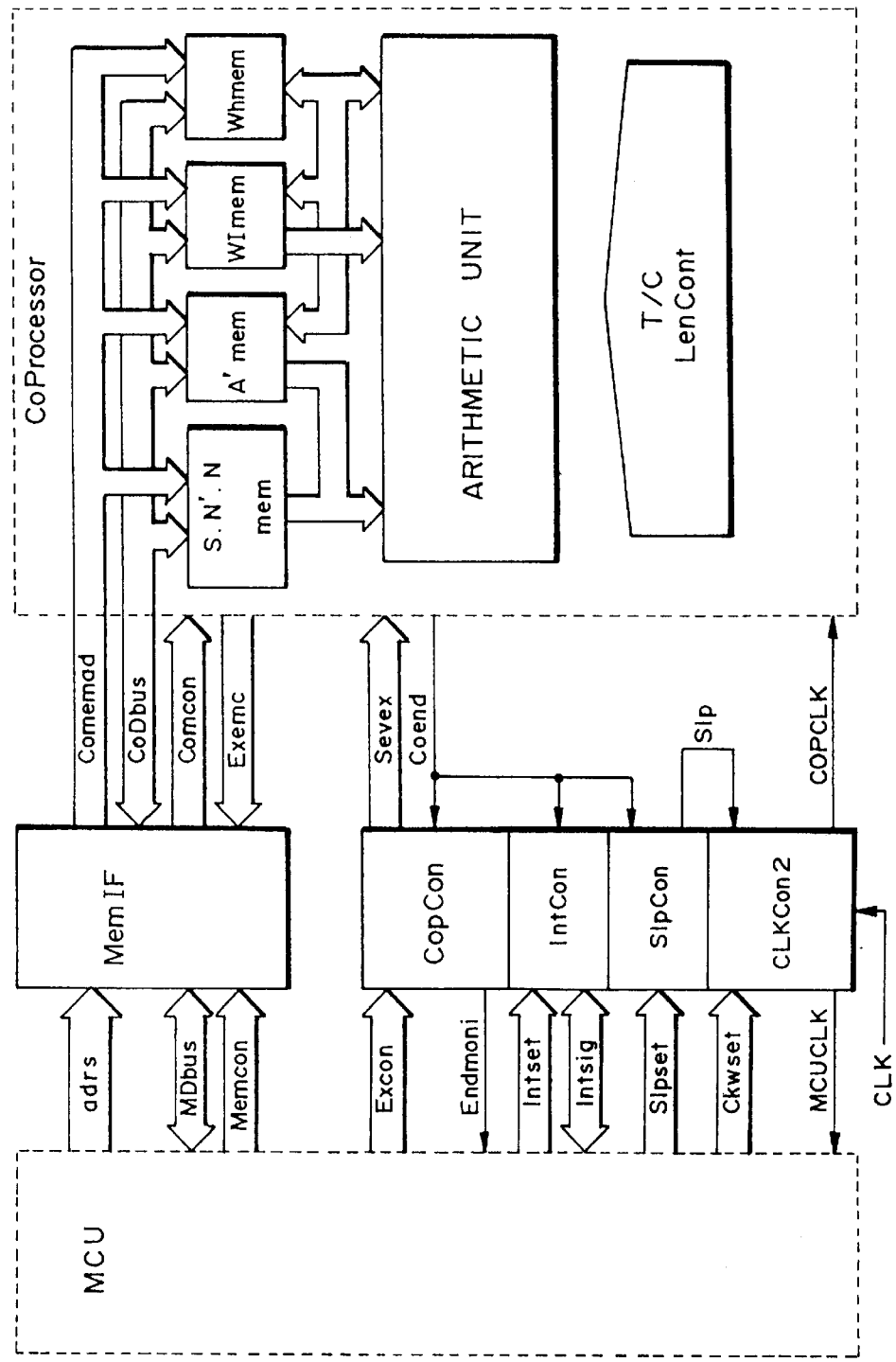
FIG. 20 is a block diagram schematically illustrating a ninth embodiment of the present invention.

FIG. 20 is a block diagram schematically illustrating the ninth embodiment, in which the clock control circuit of the eighth embodiment is modified to constitute the frequency multiplied clock control circuit.

The frequency multiplied clock control circuit may be added to the sixth or seventh embodiment separately.

In FIG. 20, CLKCon2 represents the clock control circuit including the frequency multiplied clock control circuit, which is supplied with a signal Ckwset from the MCU as a frequency multiplication setting signal to operate the frequency multiplication function.

The frequency multiplication function is operated in response to the clock CLK supplied externally, and the circuit thereof is constituted so that the prepared frequency multiplied clock is produced as the clock MCUCLK for the MCU, the clock COPCLK for the coprocessor or both of them. Thus, the user can make various selection in the system in consideration of trade-off of the consumption current.

The frequency multiplication function can be canceled by inputting the signal Ckwset as a cancellation signal in the same manner as the setting thereof.

The frequency multiplied clock control circuit can be constituted to be distributed in a local memory area as a peripheral circuit of the MCU similarly to the arithmetic control CopCon and to make direct access by an instruction of the MCU and can be realized by a relatively simple circuit.

As described above, according to the ninth embodiment, the modular arithmetic coprocessor with the external interface or the MCU including the modular arithmetic coprocessor having the frequency multiplication function of the system can be constituted by a relatively small-scale circuit to improve the operation processing speed of the whole system and can be realized by LSI.

The high-speed multiplier/adder Mul/Add shown in the first to fifth embodiments may be constituted by the multiplier and the adder provided separately.

The high-speed multiplier/adder Mul/Add and the high-speed adder Add shown in the first to fifth embodiments may be constituted integrally.

The high-speed multiplier/adder Mul/Add and the high-speed adder Add shown in the first to fifth embodiments may be constituted by commercially available ICs.

The coprocessor shown in the sixth to ninth embodiments is constituted on the basis of the coprocessor shown in the first to fifth embodiments but may be constituted by another coprocessor having the same function as that of the coprocessor shown in the first to fifth embodiment.

The long-bit-length multiplication algorithm shown in the first to fifth embodiments has been described generally, while another algorithm (for example, BOOTH or the like) capable of being used by the hardware structure used in the description may be constituted by the timing/control circuit.

In the description of the second to fifth embodiments, the "0" detection circuit ZeroC is used to reduce the arithmetic value memories as the primary object, while the ZeroC can be used to control the sequence so that, for example, when contents of the multiplier or the multiplicand of the unit of multiplication, the arithmetic operation is omitted and the value on the way of the arithmetic operation is set to 0 to proceed to the next operation to thereby reduced the operation time.

In the fifth embodiment, the number of the multiplicand storage register is increased, while the bit length of the multiplicand storage register is lengthened to increase the size thereof.

As described above, according to the representative of the present invention, when the solution of the modulo exponentiation arithmetic is obtained, the previously prepared mode signal can be merely supplied to thereby execute the various arithmetic operations.

What is claimed is:

1. An arithmetic apparatus for use in calculating modular exponential arithmetic $M^e$ mod N, where M, e, and N are positive integers, said arithmetic apparatus comprising:

an A register;

a B register;

modular arithmetic circuits operable to perform a first mode modular arithmetic $A \times A \times R' \bmod N$, where A is a number stored in said A register, R' is the inverse of R where $R \times R' \bmod N=1$, R is a number slightly larger than N and $R=2n$, and $N=2_{n-1}+2_{n-2}\cdot 2^{n-2}+ \ldots +a_1 \cdot 2^1+a_0 2^0$, a second mode modular arithmetic $A \times B \times R' \bmod N$, where B is a number stored in said B register, and a third mode modular arithmetic $A \times R' \bmod N$; and a timing/control circuit operable to output operation timing signals for controlling all circuits of said arithmetic apparatus, and, based on a prescribed procedure, to output first control signals to said modular arithmetic circuits so as to control said modular arithmetic circuits to perform the first mode modular arithmetic, second control signals to said modular arithmetic circuits so as to control said modular arithmetic circuits to perform the second mode modular arithmetic, and third control signals to said modular arithmetic circuits so as to control said modular arithmetic circuits to perform the third mode modular arithmetic so as to calculate the modular exponential arithmetic $M^e \bmod N$.

2. An arithmetic apparatus as claimed in claim 1, further comprising:

a zero detection circuit operable to detect an arithmetic value of zero of a result of the first, second, or third mode arithmetic performed by said modular arithmetic circuits and to control a sequence of said arithmetic apparatus for a subsequent arithmetic operation.

3. An arithmetic apparatus as claimed in claim 2, further comprising:

a bit-length selection-control circuit operable to select a bit-length of an operand so as to change the operation timing signals outputted by said timing/control circuit and/or said control signals outputted by said timing/control circuit.

4. An arithmetic apparatus as claimed in claim 3, for use with an external circuit, said arithmetic apparatus further comprising a C register, wherein:

said modular arithmetic circuits are further operable to perform a fourth mode modular arithmetic $A \times B + C$, where C is a number stored in said C register; and said timing/control circuit is further operable to receive a fourth mode signal from the external circuit and to output fourth control signals to said modular arithmetic circuits based on the fourth mode signal received from the external circuit so as to control said modular arithmetic circuits to perform the fourth mode modular arithmetic.

5. An arithmetic apparatus as claimed in claim 4, further comprising:

a multiplier storage device and a multiplicand storage device, wherein at least one of said multiplier storage device and said multiplicand storage device comprises a plurality of registers;

a selecting circuit operable to select an output from said plurality of registers;

an upper digit register operable to store an uppermost digit output value of an arithmetic operation of said modular arithmetic circuits; and a lower digit register operable to store a lowermost digit output value of an arithmetic operation of said modular arithmetic circuits.

6. An arithmetic apparatus as claimed in claim 5, for use with an external unit, said arithmetic apparatus further comprising:

an arithmetic performing control circuit for coupling said arithmetic apparatus to the external unit, wherein said arithmetic performing control circuit is operable to receive signals from the external unit and to provide to said arithmetic apparatus signals corresponding to the signals received from the external unit.

7. An arithmetic apparatus as claimed in claim 6, further comprising:

an exclusive interrupt control circuit operable to detect a completion of any of the first, second, or third mode modular arithmetic and to provide an interruption signal to said arithmetic apparatus.

8. An arithmetic apparatus as claimed in claim 7, further comprising:

a clock control circuit operable to control the external unit; and a sleep control circuit operable to detect a sleep set signal from the external unit and to output a sleep signal to said clock control circuit in response to the sleep set signal.

9. An arithmetic apparatus as claimed in claim 8, further comprising:

a clock multiplying circuit operable to produce a multiplied clock signal by multiplying a clock signal received from the external unit and to input the multiplied clock signal into said arithmetic apparatus for the performance of the modular arithmetic.

10. An arithmetic apparatus as claimed in claim 7, further comprising:

a clock multiplying circuit operable to produce a multiplied clock signal by multiplying a clock signal received from the external unit and to input the multiplied clock signal into said arithmetic apparatus for the performance of the modular arithmetic.

11. An arithmetic apparatus as claimed in claim 6, further comprising:

a clock control circuit operable to control the external unit; and a sleep control circuit operable to detect a sleep set signal from the external unit and to output a sleep signal to said clock control circuit in response to the sleep set signal.

12. An arithmetic apparatus as claimed in claim 6, further comprising:

a clock multiplying circuit operable to produce a multiplied clock signal by multiplying a clock signal received from the external unit and to input the multiplied clock signal into said arithmetic apparatus for the performance of the modular arithmetic.

13. An arithmetic apparatus as claimed in claim 4, for use with an external unit, said arithmetic apparatus further comprising:

an arithmetic performing control circuit for coupling said arithmetic apparatus to the external unit, wherein said arithmetic performing control circuit is operable to receive signals from the external unit and to provide to said arithmetic apparatus signals corresponding to the signals received from the external unit.

14. An arithmetic apparatus as claimed in claim 3, further comprising:

a multiplier storage device and a multiplicand storage device, wherein at least one of said multiplier storage device and said multiplicand storage device comprises a plurality of registers;

a selecting circuit operable to select an output from said plurality of registers;

an upper digit register operable to store an uppermost digit output value of an arithmetic operation of said modular arithmetic circuits; and a lower digit register operable to store a lowermost digit output value of an arithmetic operation of said modular arithmetic circuits.

15. An arithmetic apparatus as claimed in claim 3, for use with an external unit, said arithmetic apparatus further comprising:

an arithmetic performing control circuit for coupling said arithmetic apparatus to the external unit, wherein said arithmetic performing control circuit is operable to receive signals from the external unit and to provide to said arithmetic apparatus signals corresponding to the signals received from the external unit.

16. An arithmetic apparatus as claimed in claim 2, for use with an external circuit, said arithmetic apparatus further comprising a C register, wherein:

said modular arithmetic circuits are further operable to perform a fourth mode modular arithmetic A×B+C, where C is a number stored in said C register; and said timing/control circuit is further operable to receive a fourth mode signal from the external circuit and to output fourth control signals to said modular arithmetic circuits based on the fourth mode signal received from the external circuit so as to control said modular arithmetic circuits to perform the fourth mode modular arithmetic.

17. An arithmetic apparatus as claimed in claim 2, further comprising:

a multiplier storage device and a multiplicand storage device, wherein at least one of said multiplier storage device and said multiplicand storage device comprises a plurality of registers;

a selecting circuit operable to select an output from said plurality of registers;

an upper digit register operable to store an uppermost digit output value of an arithmetic operation of said modular arithmetic circuits; and a lower digit register operable to store a lowermost digit output value of an arithmetic operation of said modular arithmetic circuits.

18. An arithmetic apparatus as claimed in claim 2, for use with an external unit, said arithmetic apparatus further comprising:

an arithmetic performing control circuit for coupling said arithmetic apparatus to the external unit, wherein said arithmetic performing control circuit is operable to receive signals from the external unit and to provide to said arithmetic apparatus signals corresponding to the signals received from the external unit.

19. An arithmetic apparatus as claimed in claim 1, further comprising:

a bit-length selection-control circuit operable to select a bit-length of an operand so as to change the operation timing signals outputted by said timing/control circuit and/or said control signals outputted by said timing/control circuit.

20. An arithmetic apparatus as claimed in claim 1, for use with an external circuit, said arithmetic apparatus further comprising a C register, wherein:

said modular arithmetic circuits are further operable to perform a fourth mode modular arithmetic A×B+C, where C is a number stored in said C register; and said timing/control circuit is further operable to receive a fourth mode signal from the external circuit and to output fourth control signals to said modular arithmetic circuits based on the fourth mode signal received from the external circuit so as to control said modular arithmetic circuits to perform the fourth mode modular arithmetic.

21. An arithmetic apparatus as claimed in claim 1, further comprising:

a multiplier storage device and a multiplicand storage device, wherein at least one of said multiplier storage device and said multiplicand storage device comprises a plurality of registers;

a selecting circuit operable to select an output from said plurality of registers;

an upper digit register operable to store an uppermost digit output value of an arithmetic operation of said modular arithmetic circuits; and a lower digit register operable to store a lowermost digit output value of an arithmetic operation of said modular arithmetic circuits.

22. An arithmetic apparatus as claimed in claim 1, for use with an external unit, said arithmetic apparatus further comprising:

an arithmetic performing control circuit for coupling said arithmetic apparatus to the external unit, wherein said arithmetic performing control circuit is operable to receive signals from the external unit and to provide to said arithmetic apparatus signals corresponding to the signals received from the external unit.

23. A computer program embodied on a computer readable medium, for use with a computer having a computer memory, and for use in instructing the computer to calculate modular exponential arithmetic $N^e$ mod N, where M, e, and N are positive integers, said computer program comprising:

a modular arithmetic program for instructing the computer to perform a first mode modular arithmetic A×A×R' mod N, where A is a number stored in the memory of the computer, R' is the inverse of R where R×R' mod N=1, R is a number slightly larger than N and R=2n, and $N=2_{n-1}+2_{n-2} \cdot 2^{n-2} + \ldots + a_1 \cdot 2^1 + a_0 2^0$, a second mode modular arithmetic A×B×R' mod N, where B is a number stored in the memory of the computer, and a third mode modular arithmetic A×R' mod N; and a timing/control program for instructing the computer to produce operation timing signals for controlling a timing of the computer in performance of the modular arithmetic, and for instructing the computer to produce, based on a prescribed procedure, first control signals so as to control the computer to perform the first mode modular arithmetic, second control signals so as to control the computer to perform the second mode modular arithmetic, and third control signals so as to control the computer to perform the third mode modular arithmetic according to said modular arithmetic program so as to calculate the modular arithmetic $M^e$ mod N.

24. A computer program embodied on a computer readable medium as claimed in claim 23, further comprising:

a zero detection program for instructing the computer to detect an arithmetic value of zero of a result of the first, second, or third mode arithmetic performed by the computer and to control a sequence of the computer for a subsequent arithmetic operation.

25. A computer program embodied on a computer readable medium as claimed in claim 24, further comprising:

a bit-length selection-control program for instructing the computer to select a bit-length of an operand so as to change the operation timing signals produced by the computer by instruction of said timing/control program and/or said control signals produced by the computer by instruction of said timing/control program.

26. A computer program embodied on a computer readable medium as claimed in claim 25, for use with an external circuit, wherein:

said modular arithmetic program is further operable for instructing the computer to perform a fourth mode modular arithmetic A×B+C, where C is a number stored in the memory of the computer; and said timing/control program is further operable for instructing the computer to receive a fourth mode signal from the external circuit and to produce fourth control signals based on the fourth mode signal received from the external circuit so as to control the computer to perform the fourth mode modular arithmetic.

27. A computer program embodied on a computer readable medium as claimed in claim 26, wherein the computer memory includes a plurality of registers, said computer program further comprising:

a selecting program for instructing the computer to select an output from the plurality of registers of the computer memory;

an upper digit program for instructing the computer to store an uppermost digit output value of an arithmetic operation into one of the registers of the computer memory; and a lower digit program for instructing the computer to store a lowermost digit output value of an arithmetic operation into another of the registers of the computer memory.

28. A computer program embodied on a computer readable medium as claimed in claim 27, for use with an external unit, said computer program further comprising:

an arithmetic performing control program for coupling the computer to the external unit, wherein said arithmetic performing control program is operable to instruct the computer to receive signals from the external unit and to produce signals corresponding to the signals received from the external unit.

29. A computer program embodied on a computer readable medium as claimed in claim 28, further comprising:

an exclusive interrupt control program for instructing the computer to detect a completion of any of the first, second, or third mode modular arithmetic and to produce an interruption signal.

30. A computer program embodied on a computer readable medium as claimed in claim 29, further comprising:

a clock control program for instructing the computer to control the external unit; and a sleep control program for instructing the computer to detect a sleep set signal from the external unit and to produce a sleep signal for said clock control program in response to the sleep set signal.

31. A computer program embodied on a computer readable medium as claimed in claim 30, further comprising:

a clock multiplying program for instructing the computer to produce a multiplied clock signal by multiplying a clock signal received from the external unit and to input the multiplied clock signal into the computer for the performance of the modular arithmetic.

32. A computer program embodied on a computer readable medium as claimed in claim 29, further comprising:

a clock multiplying program for instructing the computer to produce a multiplied clock signal by multiplying a clock signal received from the external unit and to input the multiplied clock signal into the computer for the performance of the modular arithmetic.

33. A computer program embodied on a computer readable medium as claimed in claim 28, further comprising:

a clock control program for instructing the computer to control the external unit; and a sleep control program for instructing the computer to detect a sleep set signal from the external unit and to produce a sleep signal for said clock control program in response to the sleep set signal.

34. A computer program embodied on a computer readable medium as claimed in claim 28, further comprising:

a clock multiplying program for instructing the computer to produce a multiplied clock signal by multiplying a clock signal received from the external unit and to input the multiplied clock signal into the computer for the performance of the modular arithmetic.

35. A computer program embodied on a computer readable medium as claimed in claim 26, for use with an external unit, said computer program further comprising:

an arithmetic performing control program for coupling the computer to the external unit, wherein said arithmetic performing control program is operable to instruct the computer to receive signals from the external unit and to produce signals corresponding to the signals received from the external unit.

36. A computer program embodied on a computer readable medium as claimed in claim 25, wherein the computer memory includes a plurality of registers, said computer program further comprising:

a selecting program for instructing the computer to select an output from the plurality of registers of the computer memory;

an upper digit program for instructing the computer to store an uppermost digit output value of an arithmetic operation into one of the registers of the computer memory; and a lower digit program for instructing the computer to store a lowermost digit output value of an arithmetic operation into another of the registers of the computer memory.

37. A computer program embodied on a computer readable medium as claimed in claim 25, for use with an external unit, said computer program further comprising:

an arithmetic performing control program for coupling the computer to the external unit, wherein said arithmetic performing control program is operable to instruct the computer to receive signals from the external unit and to produce signals corresponding to the signals received from the external unit.

38. A computer program embodied on a computer readable medium as claimed in claim 24, for use with an external circuit, wherein:

said modular arithmetic program is further operable for instructing the computer to perform a fourth mode modular arithmetic A×B+C, where C is a number stored in the memory of the computer; and said timing/control program is further operable for instructing the computer to receive a fourth mode signal from the external circuit and to produce fourth control signals based on the fourth mode signal received from the external circuit so as to control the computer to perform the fourth mode modular arithmetic.

39. A computer program embodied on a computer readable medium as claimed in claim 24, wherein the computer memory includes a plurality of registers, said computer program further comprising:

a selecting program for instructing the computer to select an output from the plurality of registers of the computer memory;

an upper digit program for instructing the computer to store an uppermost digit output value of an arithmetic operation into one of the registers of the computer memory; and a lower digit program for instructing the computer to store a lowermost digit output value of an arithmetic operation into another of the registers of the computer memory.

40. A computer program embodied on a computer readable medium as claimed in claim 24, for use with an external unit, said computer program further comprising:

an arithmetic performing control program for coupling the computer to the external unit, wherein said arithmetic performing control program is operable to instruct the computer to receive signals from the external unit and to produce signals corresponding to the signals received from the external unit.

41. A computer program embodied on a computer readable medium as claimed in claim 23, further comprising:

a bit-length selection-control program for instructing the computer to select a bit-length of an operand so as to change the operation timing signals produced by the computer by instruction of said timing/control program and/or said control signals produced by the computer by instruction of said timing/control program.

42. A computer program embodied on a computer readable medium as claimed in claim 23, for use with an external circuit, wherein:

said modular arithmetic program is further operable for instructing the computer to perform a fourth mode modular arithmetic A×B+C, where C is a number stored in the memory of the computer; and said timing/control program is further operable for instructing the computer to receive a fourth mode signal from the external circuit and to produce fourth control signals based on the fourth mode signal received from the external circuit so as to control the computer to perform the fourth mode modular arithmetic.

43. A computer program embodied on a computer readable medium as claimed in claim 23, wherein the computer memory includes a plurality of registers, said computer program further comprising:

a selecting program for instructing the computer to select an output from the plurality of registers of the computer memory;

an upper digit program for instructing the computer to store an uppermost digit output value of an arithmetic operation into one of the registers of the computer memory; and a lower digit program for instructing the computer to store a lowermost digit output value of an arithmetic operation into another of the registers of the computer memory.

44. A computer program embodied on a computer readable medium as claimed in claim 23, for use with an external unit, said computer program further comprising:

an arithmetic performing control program for coupling the computer to the external unit, wherein said arithmetic performing control program is operable to instruct the computer to receive signals from the external unit and to produce signals corresponding to the signals received from the external unit.

* * * * *